(12) United States Patent
Nakajima

(10) Patent No.: US 11,173,746 B2
(45) Date of Patent: Nov. 16, 2021

(54) BICYCLE HUB ASSEMBLY

(71) Applicant: SHIMANO INC., Sakai (JP)

(72) Inventor: Jun Nakajima, Sakai (JP)

(73) Assignee: SHIMANO INC., Sakai (JP)

( * ) Notice: Subject to any disclaimer, the term of this patent is extended or adjusted under 35 U.S.C. 154(b) by 62 days.

(21) Appl. No.: 16/735,589

(22) Filed: Jan. 6, 2020

(65) Prior Publication Data

US 2020/0398611 A1    Dec. 24, 2020

Related U.S. Application Data

(63) Continuation-in-part of application No. 16/445,133, filed on Jun. 18, 2019, now abandoned.

(51) Int. Cl.
| | |
|---|---|
| *B60B 27/04* | (2006.01) |
| *B60B 27/02* | (2006.01) |
| *B60B 27/00* | (2006.01) |
| *F16D 41/36* | (2006.01) |

(52) U.S. Cl.
CPC ........ *B60B 27/047* (2013.01); *B60B 27/0026* (2013.01); *B60B 27/023* (2013.01); *F16D 41/36* (2013.01)

(58) Field of Classification Search
CPC . B60B 27/047; B60B 27/0026; B60B 27/023; B60B 27/0031; F16D 41/36; F16D 41/24
See application file for complete search history.

(56) References Cited

U.S. PATENT DOCUMENTS

| | | |
|---|---|---|
| 9,707,801 B2 | 7/2017 | Fujita et al. |
| 2015/0202919 A1 | 7/2015 | Koshiyama |
| 2017/0232791 A1* | 8/2017 | Fujita .................. B60B 27/0031 192/64 |
| 2019/0135036 A1* | 5/2019 | Meggiolan ............ B60B 27/023 |

\* cited by examiner

*Primary Examiner* — Mark A Manley
(74) *Attorney, Agent, or Firm* — Mori & Ward, LLP

(57) ABSTRACT

A bicycle hub assembly comprises a hub axle, a hub shell, a sprocket support body, a first ratchet member, a second ratchet member, a first biasing member, at least one receiving member, and a second biasing member. The first ratchet member is provided between the second ratchet member and the first biasing member in an axial direction. The at least one receiving member is provided between the first ratchet member and the first biasing member in a radial direction with respect to a rotational axis. The at least one receiving member includes a radially receiving part having a radially outer surface. The second biasing member contacts the radially outer surface of the radially receiving part to bias the radially receiving part toward the rotational axis in the radial direction.

20 Claims, 19 Drawing Sheets

BICYCLE HUB ASSEMBLY

CROSS-REFERENCE TO RELATED APPLICATIONS

The present application is a continuation-in-part application of the U.S. patent application Ser. No. 16/445,133 filed Jun. 18, 2019. The contents of this application are incorporated herein by reference in their entirety.

BACKGROUND OF THE INVENTION

Field of the Invention

The present invention relates to a bicycle hub assembly.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a hub assembly.

SUMMARY OF THE INVENTION

In accordance with a first aspect of the present invention, a bicycle hub assembly comprises a hub axle, a hub shell, a sprocket support body, a first ratchet member, a second ratchet member, a first biasing member, at least one receiving member, and a second biasing member. The hub axle defines a rotational axis. The hub shell is rotatably mounted to the hub axle to rotate about the rotational axis. The hub shell includes at least one first tooth. The sprocket support body is rotatably mounted to the hub axle to rotate about the rotational axis. The sprocket support body includes a first helical spline. The first ratchet member includes at least one first ratchet tooth, a second helical spline, and a receiving surface. The second helical spline is configured to engage with the first helical spline. The receiving surface faces in an axial direction with respect to the rotational axis. The second ratchet member includes at least one second ratchet tooth and at least one second tooth. The at least one second ratchet tooth is configured to engage with the at least one first ratchet tooth. The at least one second tooth is configured to engage with the at least one first tooth. The first biasing member is provided between the hub shell and the first ratchet member in the axial direction to bias the first ratchet member toward the second ratchet member. The first ratchet member is provided between the second ratchet member and the first biasing member in the axial direction. The at least one receiving member is provided between the first ratchet member and the first biasing member in a radial direction with respect to the rotational axis. The at least one receiving member includes a radially receiving part having a radially outer surface. The second biasing member contacts the radially outer surface of the radially receiving part to bias the radially receiving part toward the rotational axis in the radial direction.

With the bicycle hub assembly according to the first aspect, the second biasing member can increase sliding resistance between the at least one receiving member and the first ratchet member in the rotational direction. Thus, it is possible to reduce noise generated between the first and second ratchet members during bicycle freewheeling or coasting.

In accordance with a second aspect of the present invention, the bicycle hub assembly according to the first aspect is configured so that the radially receiving part has a torque transmitting profile to transmit rotational torque between the at least one receiving member and the hub shell.

With the bicycle hub assembly according to the second aspect, it is possible to reliably transmit the rotation of the hub shell to the receiving member. Thus, it is possible to effectively reduce noise generated between the first and second ratchet members during bicycle freewheeling or coasting.

In accordance with a third aspect of the present invention, the bicycle hub assembly according to the first or second aspect is configured so that the second biasing member has an annular shape.

With the bicycle hub assembly according to the third aspect, it is possible to reliably increase the sliding resistance between the at least one receiving member and the first ratchet member.

In accordance with a fourth aspect of the present invention, the bicycle hub assembly according to the third aspect is configured so that the second biasing member has a first circumferential end and a second circumferential end configured to be spaced apart from the first circumferential end in a circumferential direction with respect to the rotational axis.

With the bicycle hub assembly according to the fourth aspect, it is possible to easily attach the second biasing member to the at least one receiving member, and increase the sliding resistance between the at least one receiving member and the first ratchet member.

In accordance with a fifth aspect of the present invention, the bicycle hub assembly according to any one of the first to fourth aspects is configured so that the first ratchet member includes a cylindrical part extending from the receiving surface in the axial direction. The at least one receiving member is provided radially outwardly of the cylindrical part.

With the bicycle hub assembly according to the fifth aspect, it is possible to reliably increase the sliding resistance between the at least one receiving member and the first ratchet member.

In accordance with a sixth aspect of the present invention, the bicycle hub assembly according to any one of the first to fifth aspects is configured so that the at least one receiving member includes a plurality of receiving members.

With the bicycle hub assembly according to the sixth aspect, it is possible to more reliably increase the sliding resistance between the at least one receiving member and the first ratchet member.

In accordance with a seventh aspect of the present invention, the bicycle hub assembly according to the sixth aspect is configured so that the plurality of the receiving members is disposed to be spaced apart from each other in a circumferential direction with respect to the rotational axis.

With the bicycle hub assembly according to the seventh aspect, it is possible to distribute a plurality of contact surfaces of the plurality of receiving member with the first ratchet member in the circumferential direction. Thus, it is possible to make the sliding resistance between the at least one receiving member and the first ratchet member substantially even in the circumferential direction.

In accordance with an eighth aspect of the present invention, the bicycle hub assembly according to any one of the first to seventh aspects is configured so that the first ratchet member is configured to engage with one of the hub shell and the sprocket support body in a torque transmitting manner. The second ratchet member is configured to engage with the other of the hub shell and the sprocket support body in a torque transmitting manner. At least one of the first ratchet member and the second ratchet member is movable relative to the hub axle in the axial direction.

With the bicycle hub assembly according to the eighth aspect, it is possible to effectively reduce noise during coasting.

In accordance with a ninth aspect of the present invention, the bicycle hub assembly according to any one of the first to eighth aspects is configured so that the first ratchet member is configured to engage with the sprocket support body in a torque transmitting manner.

With the bicycle hub assembly according to the ninth aspect, it is possible to more effectively reduce noise during coasting.

In accordance with a tenth aspect of the present invention, the bicycle hub assembly according to the first to ninth aspect is configured so that the sprocket support body has an outer peripheral surface to which the first helical spline is provided, and includes a guiding portion provided to the outer peripheral surface to guide the first ratchet member toward the hub shell during coasting.

With the bicycle hub assembly according to the tenth aspect, it is possible to more effectively reduce noise during coasting.

In accordance with an eleventh aspect of the present invention, the bicycle hub assembly according to the tenth aspect is configured so that the guiding portion guides the first ratchet member toward the hub shell to release meshing engagement between the at least one first ratchet tooth and the at least one second ratchet tooth during coasting.

With the bicycle hub assembly according to the eleventh aspect, it is possible to effectively reduce noise during coasting.

In accordance with a twelfth aspect of the present invention, the bicycle hub assembly according to any one of the first to eleventh aspects is configured so that the at least one receiving member includes an axially receiving part provided between the receiving surface of the first ratchet member and the first biasing member in the axial direction. The radially receiving part extends from the axially receiving part in the axial direction.

With the bicycle hub assembly according to the twelfth aspect, it is possible to effectively increase the sliding resistance between the at least one receiving member and the first ratchet member. Thus, it is possible to effectively reduce noise generated between the first and second ratchet members during bicycle freewheeling or coasting.

In accordance with a thirteenth aspect of the present invention, a bicycle hub assembly comprises a hub axle, a hub shell, a sprocket support body, a first ratchet member, a second ratchet member, a first biasing member, and at least one receiving member. The hub axle defines a rotational axis. The hub shell is rotatably mounted to the hub axle to rotate about the rotational axis. The hub shell includes at least one first tooth. The sprocket support body is rotatably mounted to the hub axle to rotate about the rotational axis. The sprocket support body includes a first helical spline. The first ratchet member includes at least one first ratchet tooth, a second helical spline, and a receiving surface. The second helical spline is configured to engage with the first helical spline. The receiving surface faces in an axial direction with respect to the rotational axis. The second ratchet member includes at least one second ratchet tooth and at least one second tooth. The at least one second ratchet tooth is configured to engage with the at least one first ratchet tooth. The at least one second tooth is configured to engage with the at least one first tooth. The first biasing member is provided between the hub shell and the first ratchet member in the axial direction to bias the first ratchet member toward the second ratchet member. The first ratchet member is provided between the second ratchet member and the first biasing member in the axial direction. The at least one receiving member has a torque transmitting profile to transmit rotational torque between the at least one receiving member and the hub shell.

With the bicycle hub assembly according to the thirteenth aspect, it is possible to reduce noise caused by ratcheting between the first and second ratchet members during bicycle freewheeling or coasting by applying a coasting torque from the hub shell to the first ratchet member via the receiving member. It is possible to reliably transmit the rotation of the hub shell to the receiving member. Furthermore, it is possible to reliably disengage the at least one first ratchet tooth from the at least one second ratchet tooth.

In accordance with a fourteenth aspect of the present invention, the bicycle hub assembly according to the thirteenth aspect is configured so that the at least one receiving member includes an axially receiving part and a radially receiving part. The axially receiving part is provided between the receiving surface of the first ratchet member and the first biasing member in the axial direction. The radially receiving part extends from the axially receiving part in the axial direction. The radially receiving part includes the torque transmitting profile.

With the bicycle hub assembly according to the fourteenth aspect, it is possible to increase sliding resistance between the at least one receiving member and the first ratchet member in the rotational direction. Thus, it is possible to reduce noise generated between the first and second ratchet members during bicycle freewheeling or coasting.

In accordance with a fifteenth aspect of the present invention, the bicycle hub assembly according to the thirteenth or fourteenth aspect is configured so that the first ratchet member includes a cylindrical part extending from the receiving surface in the axial direction. The at least one receiving member is provided radially outwardly of the cylindrical part.

With the bicycle hub assembly according to the fifteenth aspect, it is possible to reliably increase sliding resistance between the at least one receiving member and the first ratchet member in the rotational direction.

In accordance with a sixteenth aspect of the present invention, the bicycle hub assembly according to any one of the thirteenth to fifteenth aspects is configured so that the at least one receiving member includes a plurality of receiving members.

With the bicycle hub assembly according to the sixteenth aspect, it is possible to more reliably increase sliding resistance between the at least one receiving member and the first ratchet member in the rotational direction.

In accordance with a seventeenth aspect of the present invention, the bicycle hub assembly according to the sixteenth aspect is configured so that the plurality of the receiving members is disposed to be spaced apart from each other in a circumferential direction with respect to the rotational axis.

With the bicycle hub assembly according to the seventeenth aspect, it is possible to distribute a plurality of contact surfaces of the plurality of receiving members with the first ratchet member in the circumferential direction. Thus, it is possible to make the sliding resistance between the at least one receiving member and the first ratchet member substantially even in the circumferential direction.

In accordance with an eighteenth aspect of the present invention, the bicycle hub assembly according to the first aspect further comprises an additional receiving member provided between the first biasing member and the second biasing member in the radial direction with respect to the rotational axis.

With the bicycle hub assembly according to the eighteenth aspect, the additional receiving member can reduce or restrict interference between the first biasing member and the second biasing member when the first biasing member is compressed.

In accordance with a nineteenth aspect of the present invention, the bicycle hub assembly according to the eighteenth aspect is configured so that the at least one receiving member includes an axially receiving part provided between the receiving surface of the first ratchet member and the first biasing member in the axial direction. The radially receiving part extends from the axially receiving part in the axial direction. The additional receiving member includes an additional axially receiving part and an additional radially receiving part. The additional axially receiving part is provided between the axially receiving part of the at least one receiving member and the first biasing member in the axial direction. The additional radially receiving part extends from the additional axially receiving part in the axial direction and is provided between the first biasing member and the second biasing member in the radial direction.

With the bicycle hub assembly according to the nineteenth aspect, the additional receiving member can reliably reduce or restrict interference between the first biasing member and the second biasing member when the first biasing member is compressed.

In accordance with a twentieth aspect of the present invention, the bicycle hub assembly according to the nineteenth aspect is configured so that the additional radially receiving part has an annular shape.

With the bicycle hub assembly according to the twentieth aspect, the additional receiving member can reliably reduce or restrict interference between the first biasing member and the second biasing member when the first biasing member is compressed.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
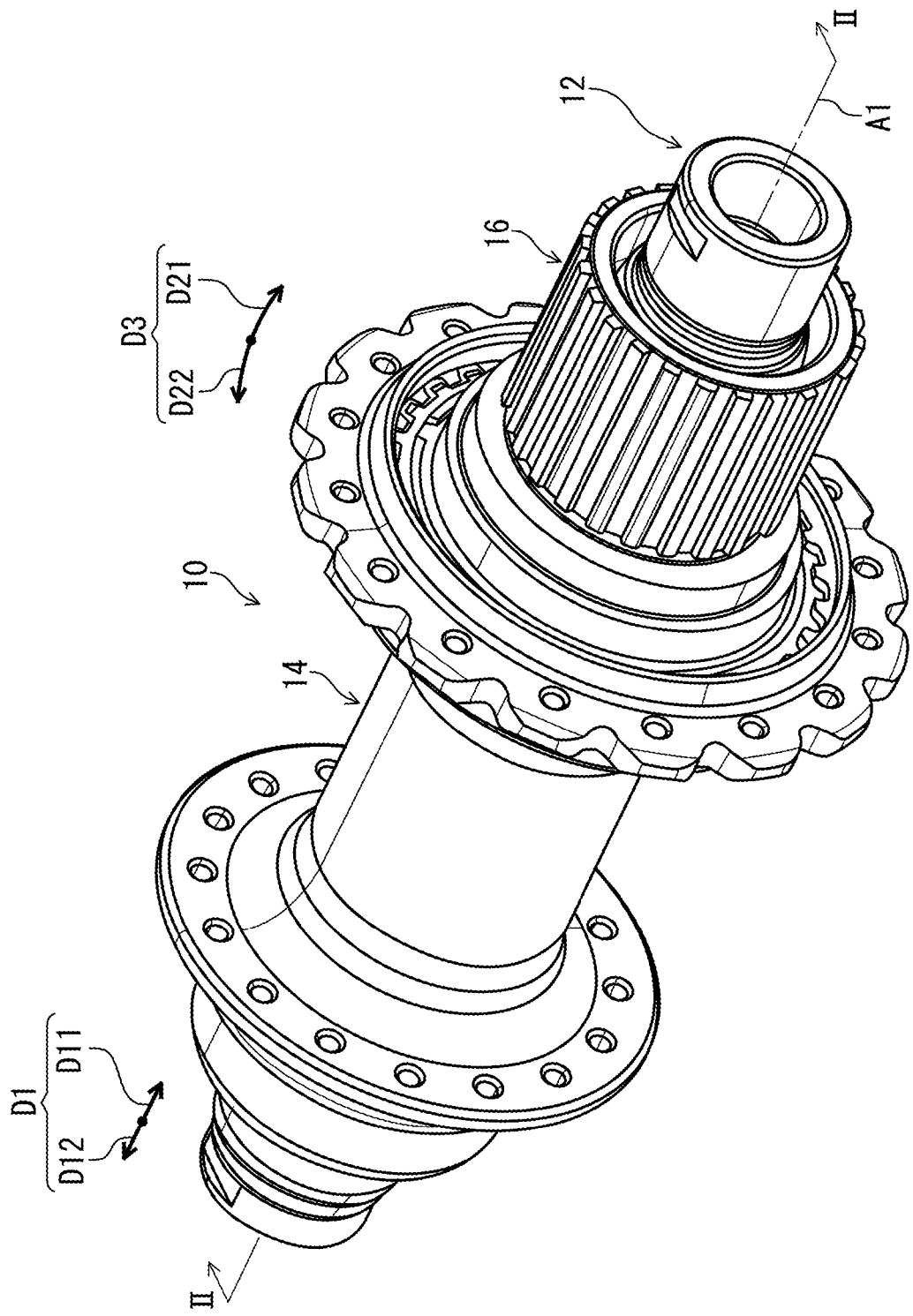
FIG. 1 is a perspective view of a bicycle hub assembly in accordance with a first embodiment.

The embodiment(s) will now be described with reference to the accompanying drawings, wherein like reference numerals designate corresponding or identical elements throughout the various drawings.

First Embodiment

Referring initially to FIG. 1, a bicycle hub assembly 10 comprises a hub axle 12, a hub shell 14, and a sprocket support body 16. The hub axle 12 defines a rotational axis A1. The hub shell 14 is rotatably mounted to the hub axle 12 to rotate about the rotational axis A1. The sprocket support body 16 is rotatably mounted to the hub axle 12 to rotate about the rotational axis A1. The sprocket support body 16 is rotatable relative to the hub shell 14 about the rotational axis A1.

Figure 2:
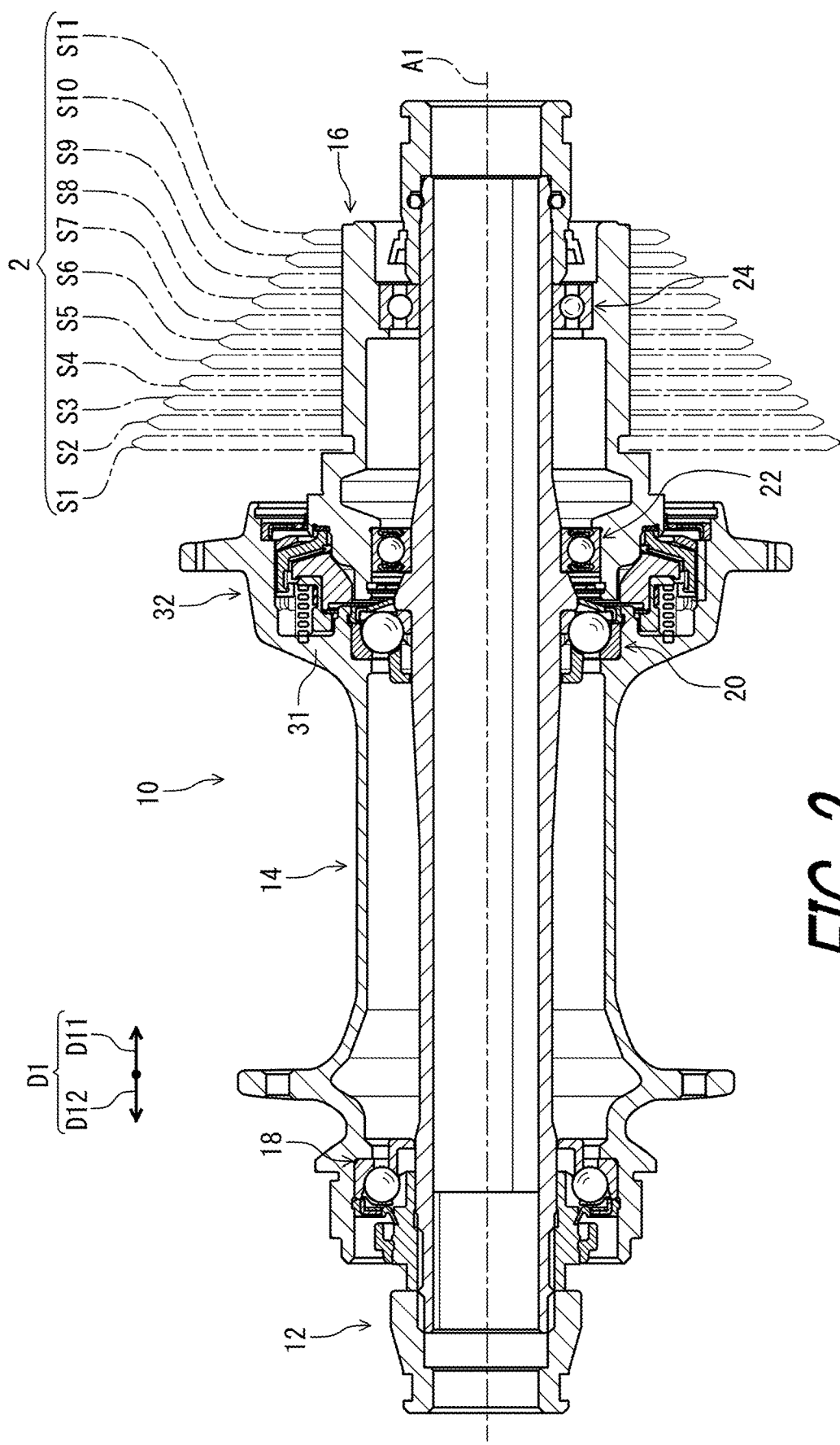
FIG. 2 is a cross-sectional view of the bicycle hub assembly taken along line of FIG. 1.

As seen in FIG. 2, the sprocket support body 16 is mounted to the hub axle 12. The sprocket support body 16 supports a sprocket assembly 2 including sprockets S1 to S11. The sprocket support body 16 receives a rotational force from the sprocket assembly 2 during pedaling.

The bicycle hub assembly 10 comprises a first bearing 18 and a second bearing 20, The first bearing 18 and the second bearing 20 are provided between the hub axle 12 and the hub shell 14 to rotatably support the hub shell 14 relative to the hub axle 12 about the rotational axis A1.

The bicycle hub assembly 10 comprises a third bearing 22 and a fourth bearing 24. The third bearing 22 and the fourth bearing 24 are provided between the hub axle 12 and the sprocket support body 16 to rotatably support the sprocket support body 16 relative to the hub axle 12 about the rotational axis A1.

Figure 3:
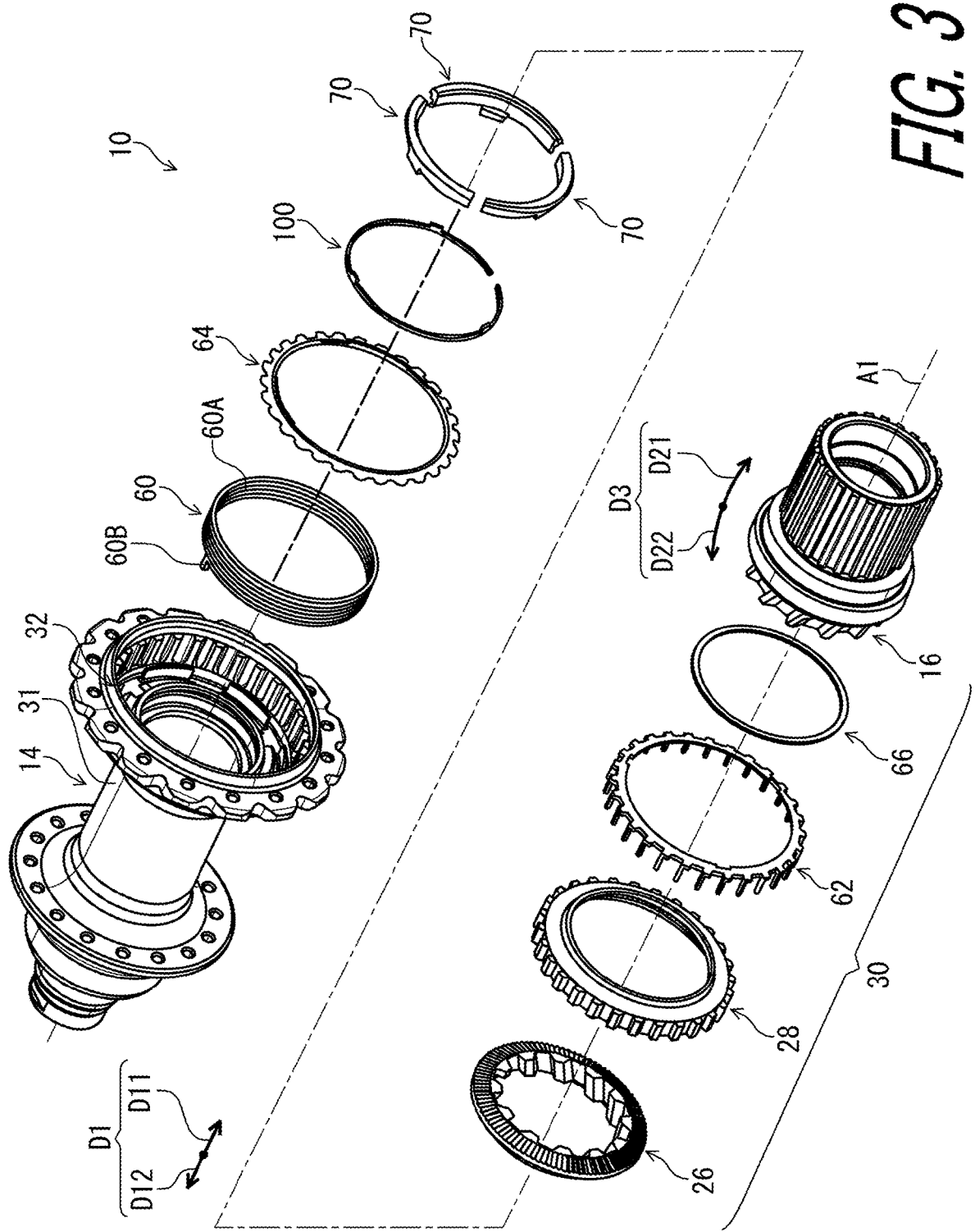
FIG. 3 is an exploded perspective view of a part of the bicycle hub assembly illustrated in FIG. 1.

As seen in FIG. 3, the bicycle hub assembly 10 comprises a first ratchet member 26 and a second ratchet member 28. The first ratchet member 26 is mounted to the sprocket support body 16. The first ratchet member 26 rotates together with the sprocket support body 16 relative to the hub shell 14 about the rotational axis A1. The second ratchet member 28 is mounted to the hub shell 14. The second ratchet member 28 rotates together with the hub shell 14 relative to the sprocket support body 16 about the rotational axis A1. The first ratchet member 26 is configured to engage with one of the hub shell 14 and the sprocket support body 16 in a torque transmitting manner. The second ratchet member 28 is configured to engage with the other of the hub shell 14 and the sprocket support body 16 in a torque transmitting manner. In this embodiment, the first ratchet member 26 is configured to engage with the sprocket support body 16 in a torque transmitting manner. The second ratchet member 28 is configured to engage with the hub shell 14 in a torque transmitting manner. However, the first ratchet member 26 can be configured to engage with the hub shell 14 in a torque transmitting manner. The second ratchet member 28 can be configured to engage with the sprocket support body 16 in a torque transmitting manner.

At least one of the first ratchet member 26 and the second ratchet member 28 is movable relative to the hub axle 12 in an axial direction D1. However, at least one of the first ratchet member 26 and the second ratchet member 28 can be configured not to be movable relative to the hub axle 12 in the axial direction D1. The axial direction D1 is parallel to the rotational axis A1. In this embodiment, the first ratchet member 26 is movable relative to the hub axle 12 and the sprocket support body 16 in the axial direction D1. The second ratchet member 28 is not movable relative to the hub axle 12 and the hub shell 14 in the axial direction D1. In this embodiment, the axial direction D1 includes a first axial direction D11 and a second axial direction D12 opposite to the first axial direction D11.

Figure 5:
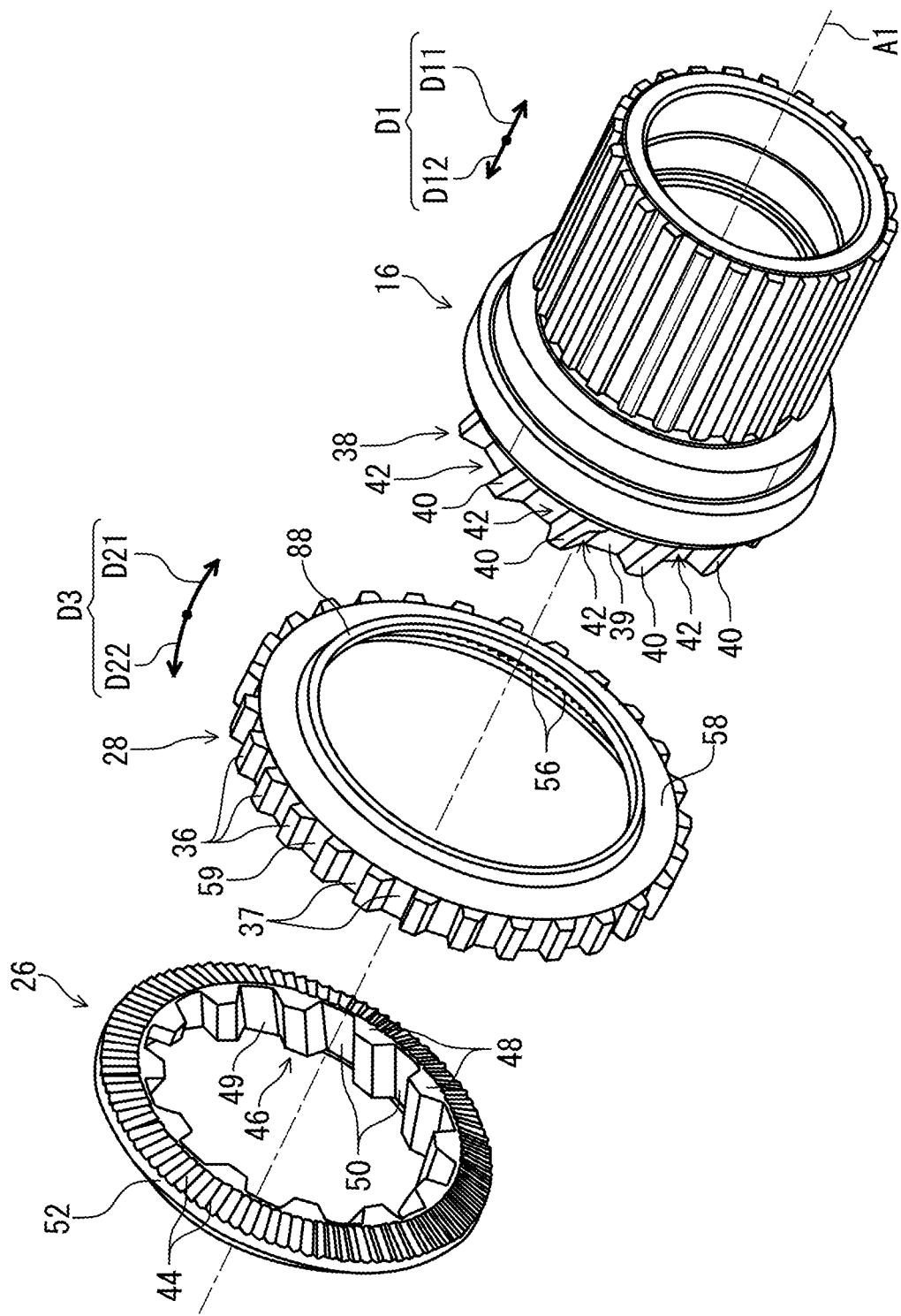
FIG. 5 is another exploded perspective view of a part of the bicycle hub assembly illustrated in FIG. 1.
Figure 6:
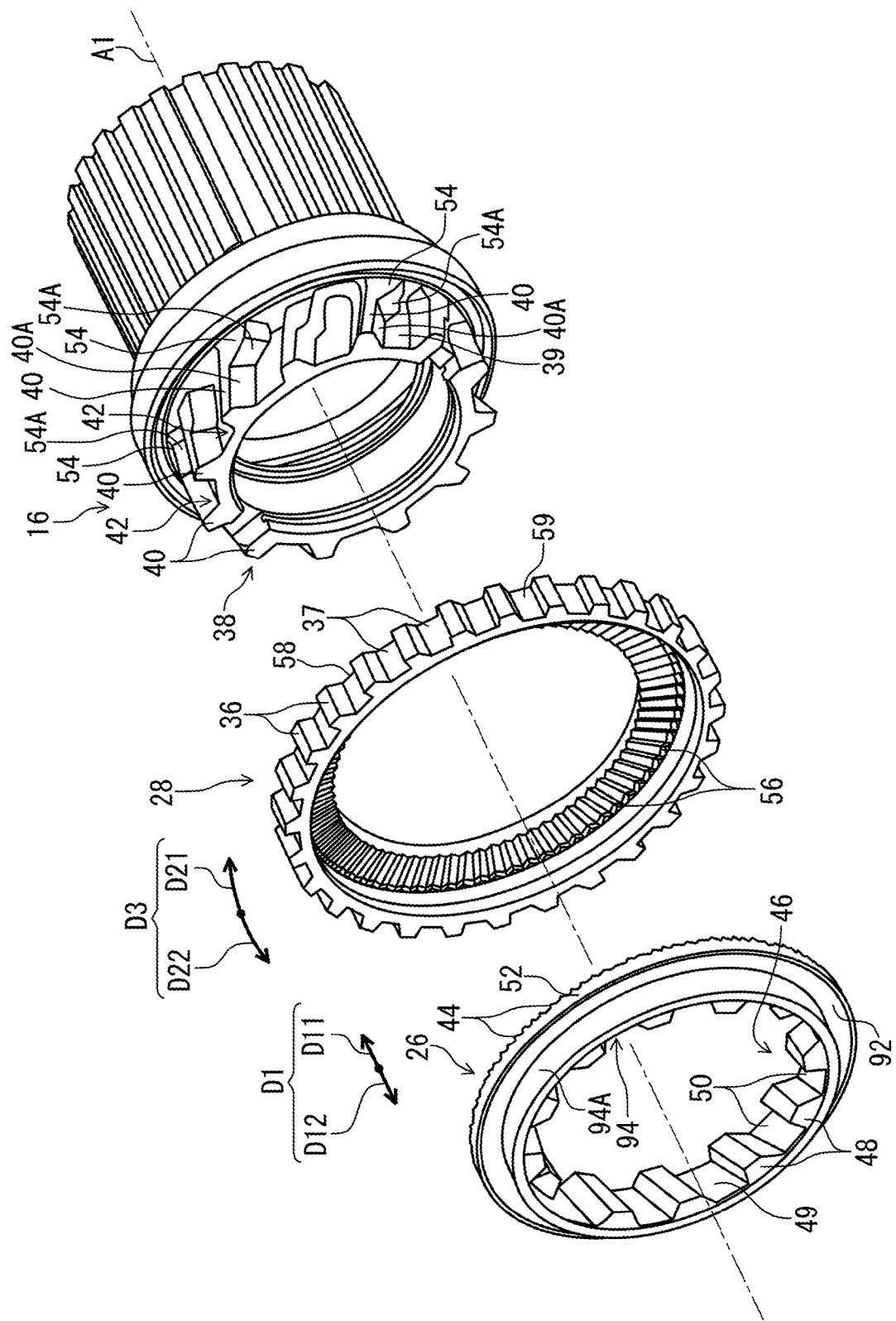
FIG. 6 is another exploded perspective view of a part of the bicycle hub assembly illustrated in FIG. 1.

As seen in FIGS. 5 and 6, the first ratchet member 26 includes an inner periphery 49. In this embodiment, the first ratchet body 52 includes the inner periphery 49. The at least one second spline tooth 48 is provided to the inner periphery 49 of the first ratchet member 26. In this embodiment, the second spline teeth 48 are provided to the inner periphery 49 of the first ratchet member 26.

Figure 7:
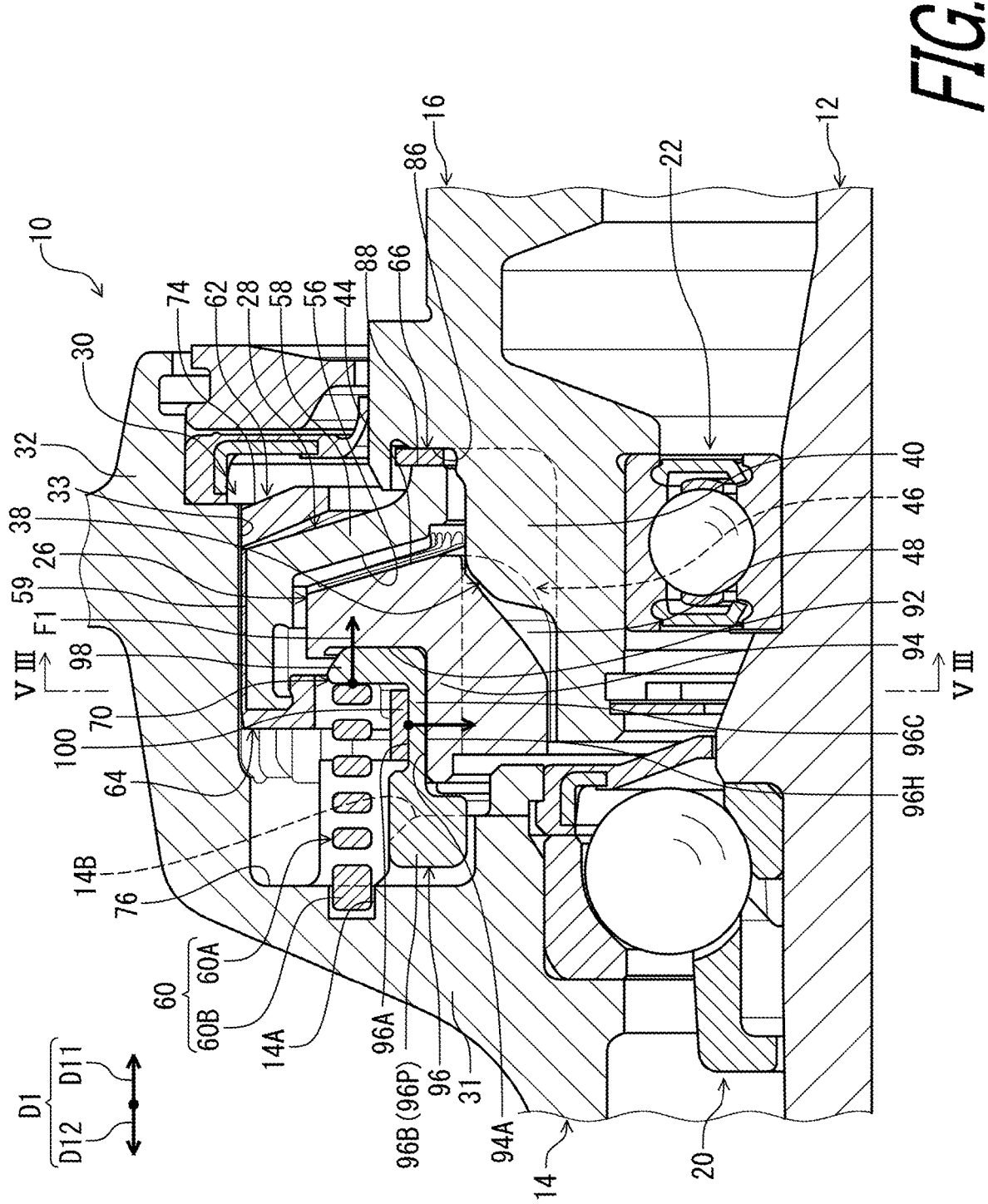
FIG. 7 is a partial cross-sectional view of the bicycle hub assembly illustrated in FIG. 1.

As seen in FIGS. 6 and 7, the first ratchet member 26 includes a receiving surface 92. The receiving surface 92 faces in the axial direction D1 with respect to the rotational axis A1. In this embodiment, the receiving surface 92 faces in the second axial direction D12. The first ratchet member 26 includes a cylindrical part 94 extending from the receiving surface 92 in the axial direction D1. In this embodiment, the cylindrical part 94 extends from the receiving surface 92 in the second axial direction D12. The cylindrical part 94 includes a radially outer surface 94A.

As seen in FIGS. 5 and 6, the second ratchet member 28 includes an outer periphery 59. In this embodiment, the second ratchet body 58 includes the outer periphery 59. The at least one second tooth 36 is provided to the outer periphery 59 of the second ratchet member 28. In this embodiment, the second teeth 36 are provided to the outer periphery 59 of the second ratchet member 28.

The second ratchet member 28 includes a second axial surface 88 facing in the axial direction D1. In this embodiment, the second axial surface 88 facing in the first axial direction D11.

The sprocket support body 16, the first ratchet member 26, and the second ratchet member 28 provide a bicycle freewheel 30. The bicycle freewheel 30 includes the sprocket support body 16, the first ratchet member 26, and the second ratchet member 28. The bicycle freewheel 30 restricts the sprocket support body 16 from rotating relative to the hub shell 14 in a driving rotational direction D21 so that a pedaling force is transmitted from the sprocket support body 16 to the hub shell 14 during pedaling. The bicycle freewheel 30 allows the hub shell 14 to rotate relative to the sprocket support body 16 in the driving rotational direction D21 so that a rotational force is not transmitted from the hub shell 14 to the sprocket support body 16 during coasting (also called freewheeling). The pedaling force corresponds to a pedaling torque T1 mentioned below. The rotational force corresponds to a coasting torque T2 mentioned below.

The driving rotational direction D21 is a direction in which the sprocket support body 16 rotates relative to a bicycle frame (not shown) during pedaling. A circumferential direction D3 of the bicycle hub assembly 10 includes the driving rotational direction D21 and an opposite rotational direction D22 opposite to the driving rotational direction D21.

Coasting or freewheeling occurs when the sprocket support body 16 stops rotating relative to the bicycle frame (not shown) while the hub shell 14 rotates relative to the bicycle frame (not shown) in the driving rotational direction D21. Coasting or freewheeling occurs when the sprocket support body 16 rotates relative to the bicycle frame (not shown) in an opposite rotational direction D22 while the hub shell 14 rotates relative to the bicycle frame (not shown) in the driving rotational direction D21 or stops rotating relative to the bicycle frame.

The hub shell 14 includes a hub shell body 31 and a freewheel housing 32. The hub shell body 31 and the freewheel housing 32 have an annular shape. The freewheel housing 32 extends from the hub shell body 31 in the axial direction D1. In this embodiment, the freewheel housing 32 extends from the hub shell body 31 in the first axial direction D11. The first ratchet member 26 and the second ratchet member 28 are provided in the freewheel housing 32.

Figure 4:
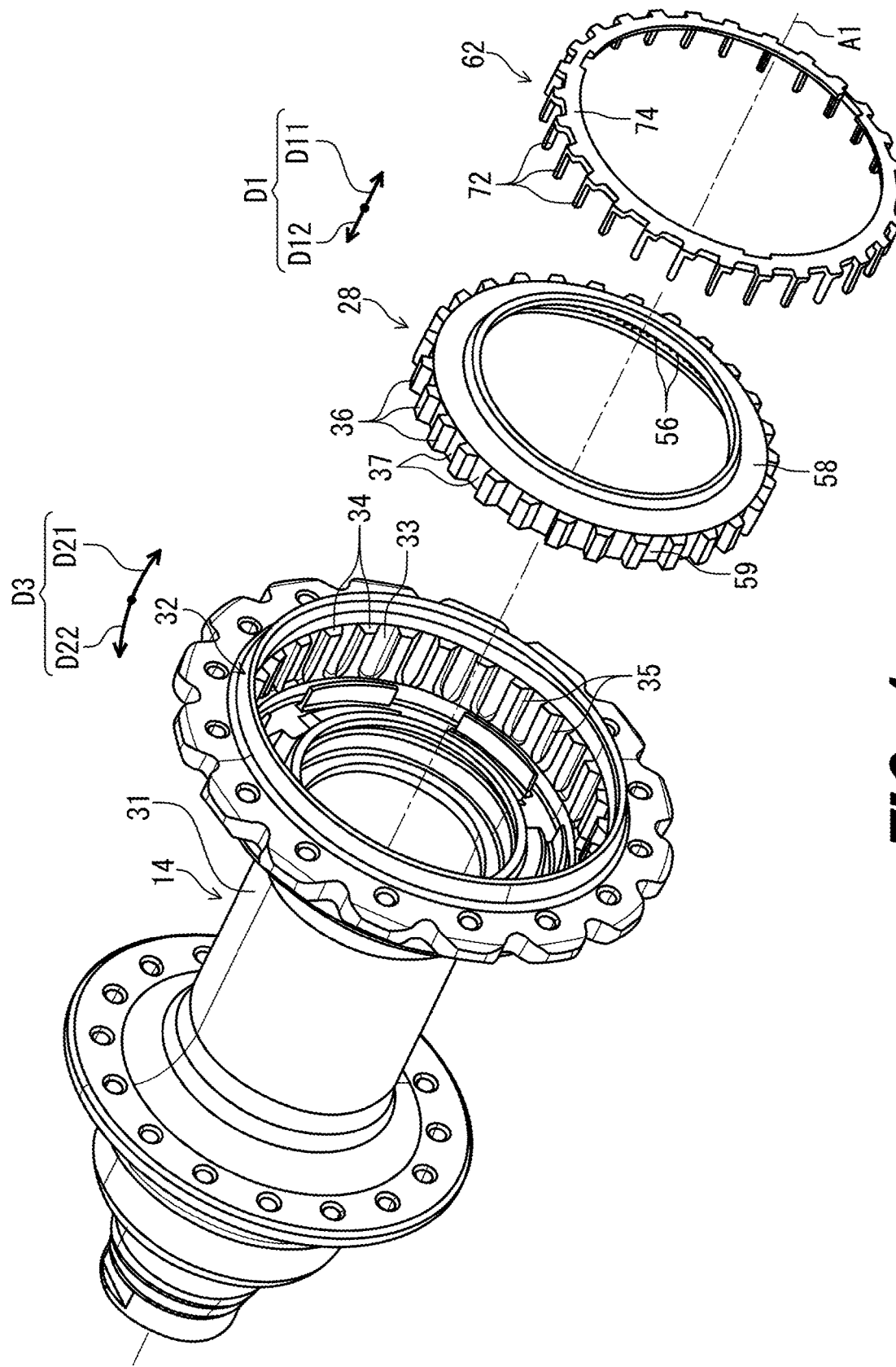
FIG. 4 is another exploded perspective view of a part of the bicycle hub assembly illustrated in FIG. 1.

As seen in FIG. 4, the hub shell 14 includes an inner peripheral surface 33. The hub shell 14 includes at least one first tooth 34. The at least one first tooth 34 is provided on the inner peripheral surface 33. The at least one first tooth 34 extends radially inwardly from the inner peripheral surface 33. In this embodiment, the freewheel housing 32 includes the inner peripheral surface 33. The hub shell 14 includes a plurality of first teeth 34. The plurality of first teeth 34 is provided to the inner peripheral surface 33. The plurality of first teeth 34 extends radially inwardly from the inner peripheral surface 33. The plurality of first teeth 34 is arranged in a circumferential direction D3. The plurality of first teeth 34 defines plurality of recesses 35 between adjacent two teeth of the plurality of first teeth 34. The plurality of first teeth 34 is respectively provided in the plurality of recesses 35. The adjacent two first teeth 34 provide the recess 35.

In this embodiment, the second ratchet member 28 includes a second ratchet body 58. The second ratchet body 58 has an annular shape. The second ratchet member 28 includes an outer periphery 59. The second ratchet member 28 includes at least one second tooth 36. The at least one second tooth 36 is provided to the outer periphery 59 of the second ratchet member 28. The at least one second tooth 36 is configured to engage with the at least one first tooth 34. In this embodiment, the second ratchet member 28 comprises a plurality of second teeth 36. The plurality of second teeth 36 is engaged with the plurality of first teeth 34. The plurality of second teeth 36 is provided to the outer periphery 59 of the second ratchet member 28. The plurality of second teeth 36 is arranged in the circumferential direction D3. The plurality of second teeth 36 defines a plurality of recesses 37 between adjacent two teeth of the plurality of second teeth 36. The plurality of second teeth 36 is respectively provided in the plurality of recesses 37. The adjacent two first teeth 36 provide the recess 37.

As seen in FIGS. 5 and 6, the sprocket support body 16 includes a first helical spline 38. The sprocket support body 16 has an outer peripheral surface 39 to which the first helical spline 38 is provided. The first helical spline 38 is provided to the outer peripheral surface 39 of the sprocket support body 16. The first helical spline 38 includes a plurality of first spline teeth 40. The first spline tooth 40 extends radially outwardly from the outer peripheral surface 39. The plurality of first spline teeth 40 extends radially outwardly from the outer peripheral surface 39. The first helical spline 38 includes a plurality of first spline grooves 42. The plurality of first spline grooves 42 is defined between adjacent two teeth of the plurality of first spline teeth 40. The plurality of first spline teeth 40 is respectively provided in the second spline grooves 42. The adjacent two first spline teeth 40 provide the first spline groove 42.

As seen in FIG. 6, the sprocket support body 16 includes at least one guiding portion 54. In this embodiment, the sprocket support body 16 includes a plurality of guiding portions 54. The sprocket support body 16 includes a guiding portion 54 provided to the outer peripheral surface 39 to guide the first ratchet member 26 toward the hub shell 14 during coasting. The guiding portion 54 guides the first ratchet member 26 toward the hub shell 14 to release meshing engagement between the at least one first ratchet tooth 44 and the at least one second ratchet tooth 56 during coasting. The plurality of guiding portions 54 is configured to guide the first ratchet member 26 toward the hub shell 14 during coasting or freewheeling. The plurality of guiding portions 54 is configured to move the first ratchet member 26 away from the second ratchet member 28 in the axial direction D1.

The guiding portion 54 is provided to the outer peripheral surface 39. The plurality of guiding portions 54 is provided to the outer peripheral surface 39. The guiding portion 54 extends radially outwardly from the outer peripheral surface 39. The plurality of guiding portions 54 extends radially outwardly from the outer peripheral surface 39. The guiding portion 54 extends from the first ratchet tooth 44 in at least the circumferential direction D3. The guiding portion 54 extends from one of the plurality of first ratchet teeth 44 in at least the circumferential direction D3. The first spline tooth 40 includes a first spline tooth surface 40A. The first spline tooth surface 40A extends helically with respect to the rotational axis A1. The guiding portion 54 includes a guiding surface 54A. The guiding portion 54 extends helically with respect to the rotational axis A1. The guiding surface 54A is inclined relative to the rotational axis A1 at an inclination angle larger than an inclination angle at which the first spline tooth surface 40A is inclined relative to the rotational axis A1. In this embodiment, the guiding portion 54 is integrally provided with the first spline tooth 40 as a one-piece unitary member. The guiding portion 54 can be a separate member from the first spline tooth 40. The guiding portion 54 can be made of a different material from a material of the first spline teeth 40. The guiding portion 54 can be made of a different material from a material of the other parts of the first helical spline 38. The guiding portion 54 can include a metallic material.

The first ratchet member 26 includes at least one first ratchet tooth 44 and a second helical spline 46. The second helical spline 46 is configured to engage with the first helical spline 38.

The first ratchet member 26 includes a second helical spline 46. The first ratchet member 26 has an inner periphery 49 to which the second helical spline 46 is provided. The second helical spline 46 is provided to an inner periphery 49 of the first ratchet body 52. The plurality of second spline teeth 48 is provided to the inner periphery 49 of the first ratchet body 52. The second helical spline 46 includes a plurality of second spline teeth 48. The second spline tooth 48 extends radially inwardly from the inner periphery 49. The plurality of second spline teeth 48 extends radially inwardly from the inner periphery 49. The second helical spline 46 includes a plurality of second spline grooves 50. The plurality of second spline grooves 50 is defined between adjacent two teeth of the plurality of second spline teeth 48. The plurality of second spline teeth 48 is respectively provided in the plurality of first spline grooves 50. The adjacent two second spline teeth 48 provide the second spline groove 50.

In this embodiment, the first ratchet member 26 includes a first ratchet body 52. The first ratchet body 52 has an annular shape. The first ratchet member 26 includes at least one first ratchet tooth 44. In this embodiment, the first ratchet member 26 comprises a plurality of first ratchet teeth 44. The plurality of first ratchet teeth 44 is arranged in the circumferential direction D3. The plurality of first ratchet teeth 44 is provided to an axial side of the first ratchet body 52. The plurality of first ratchet teeth 44 radially extends relative to the rotational axis A1. The plurality of first ratchet teeth 44 provides a serration. The plurality of first ratchet teeth 44 provides a serration on the axial side of the first ratchet body 52.

The first ratchet tooth 44 is provided to an axial side of the first ratchet body 52. In this embodiment, the plurality of first ratchet teeth 44 is provided to the axial side of the first ratchet body 52. The first ratchet tooth 44 protrudes from the first ratchet body 52 in the axial direction D1. In this embodiment, the first ratchet tooth 44 protrudes from the first ratchet body 52 in the first axial direction D11. The plurality of first ratchet teeth 44 faces in the first axial direction D11. The first ratchet teeth 44 radially extend relative to the rotational axis A1. The first ratchet teeth 44 provide a serration on the axial side of the first ratchet body 52. The first teeth 44 extend radially outwardly from the first ratchet body 52.

In this embodiment, the second ratchet member 28 includes a second ratchet body 58. The second ratchet body 58 has an annular shape. The second ratchet member 28 includes at least one second ratchet tooth 56. In this embodiment, the second ratchet member 28 comprises a plurality of second ratchet teeth 56. The plurality of second ratchet teeth 56 is arranged in the circumferential direction D3. The plurality of second ratchet teeth 56 is provided to an axial side of the second ratchet body 58. The plurality of second ratchet teeth 56 radially extends relative to the rotational axis A1. The plurality of second ratchet teeth 56 provides a serration. The plurality of second ratchet teeth 56 provides a serration on the axial side of the second ratchet body 58.

The at least one second ratchet tooth 56 is configured to engage with the at least one first ratchet tooth 44. In this embodiment, the plurality of second ratchet teeth 56 is engageable with the plurality of first ratchet teeth 44. The first ratchet member 26 and the second ratchet member 28 rotate together in a state where the plurality of second ratchet teeth 56 is engaged with the plurality of first ratchet teeth 44.

The second ratchet tooth 56 is provided to an axial side of the second ratchet body 58. In this embodiment, the plurality of second ratchet teeth 56 is provided to an axial side of the second ratchet body 58. The second ratchet tooth 56 protrudes from the second ratchet body 58 in the axial direction D1. In this embodiment, the second ratchet tooth 56 protrudes from the second ratchet body 58 in the second axial direction D12. The plurality of second ratchet teeth 56 faces in the second axial direction D12. The second ratchet teeth 56 radially extend relative to the rotational axis A1. The second ratchet teeth 56 provide a serration to the axial side of the second ratchet body 58. The second teeth 36 extend radially outwardly from the second ratchet body 58.

As seen in FIG. 3, the bicycle hub assembly 10 comprises a first biasing member 60. The first biasing member 60 is provided between the hub shell 14 and the first ratchet member 26 in the axial direction D1 to bias the first ratchet member 26 toward the second ratchet member 28. In this embodiment, for example, the first biasing member 60 is a compression spring.

As seen in FIG. 7, the first biasing member 60 is compressed between the hub shell 14 and the first ratchet member 26 in the axial direction D1. The first biasing member 60 is compressed between the hub shell body 31 and the first ratchet member 26 in the axial direction D1. The first biasing member 60 is provided between the hub shell 14 and the first ratchet member 26 in the axial direction D1. The first ratchet member 26 is provided between the second ratchet member 28 and the first biasing member 60 in the axial direction D1. The first biasing member 60 biases the first ratchet member 26 toward the second ratchet member 28. The first biasing member 60 axially biases the axially receiving part 98 of the receiving member 70 against the receiving surface 92 of the first ratchet member 26. The first biasing member 60 biases the first ratchet member 26 toward the second ratchet member 28 to maintain an engagement state where the first ratchet member 26 and the second ratchet member 28 are engaged with each other via the plurality of first ratchet teeth 44 and the plurality of second ratchet teeth 56.

Figure 11:
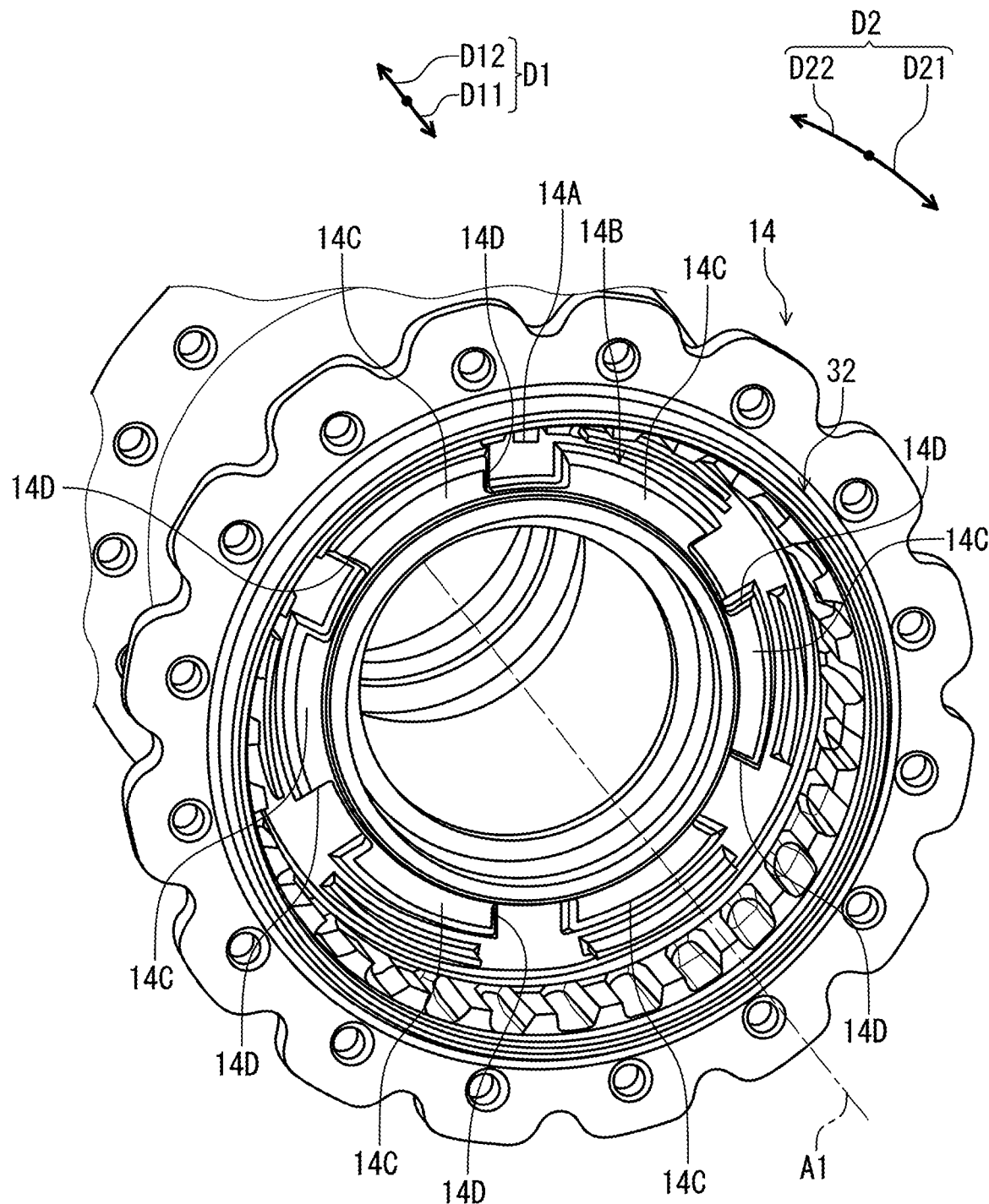
FIG. 11 is a perspective view of a hub shell of the bicycle hub assembly illustrated in FIG. 1.

Preferably, the first biasing member 60 is mounted to the hub shell 14 to rotate together with the hub shell 14 about the rotational axis A1 (FIG. 3). The first biasing member 60 includes a coiled body 60A. The first biasing member 60 includes a connecting end 60B. The connecting end 60B protrudes from the coiled body 60A in the axial direction D1. In this embodiment, the connecting end 60B protrudes from the end portion of the coiled body 60A in the second axial direction D12. As seen in FIG. 11, the hub shell body 31 of the hub shell 14 includes a connecting hole 14A. The connecting hole 14A is provided on the surface facing in the axial direction D1 of the hub shell 14. In this embodiment, the connecting hole 14A is provided on the surface facing in the first axial direction D11 of the hub shell 14. The connecting end 60B is provided in the connecting hole 14A. Thus, the first biasing member 60 rotates together with the hub shell 14 about the rotational axis A1. The connecting end 60B is provided in the connecting hole 14A so that the first biasing member 60 rotates together with the hub shell 14 about the rotational axis A1.

The axially receiving part 98 slidably contacts the receiving surface 92 of the first ratchet member 26. The first biasing member 60 increases a frictional force generated between the axially receiving part 98 of the receiving member 70 and the receiving surface 92 of the first ratchet member 26. As the first ratchet member 26 moves in the second axial direction D12, the force of the first biasing member 60 increases. Thus, as the first ratchet member 26 moves in the second axial direction D12, the frictional force increases.

The bicycle hub assembly 10 comprises at least one receiving member 70. In this embodiment, the bicycle hub assembly 10 comprises a plurality of receiving members 70. The at least one receiving member 70 includes a plurality of receiving members 70. For example, the bicycle hub assembly 10 comprises three receiving members 70. For example, the at least one receiving member 70 includes three receiving members 70. For example, the plurality of receiving members 70 has the same shape as each other. However, the plurality of receiving members 70 can have different shapes from each other. The plurality of the receiving members 70 is disposed to be spaced apart from each other in the circumferential direction D3 with respect to the rotational axis A1. The receiving member 70 has an arc shape extending in the circumferential direction D3. The receiving member 70 can have an annular shape. The annular shape is cut at one place. The shape is called C-shape. Thus, the receiving member 70 can clamp the first ratchet member 26. The receiving member 70 can have at least one groove parallel to the rotational axis A1. The at least one groove make the receiving member 70 clamp the first ratchet member 26 easily. For example, the at least one groove is provided to the radially outwardly surface of the receiving member 70. However, a total number of the receiving members 70 is not limited to this embodiment. The shape of the receiving member 70 is not limited to this embodiment.

As seen in FIG. 3, the bicycle hub assembly 10 comprises a spacer 62, a supporting member 64, and a sliding member 66. At least one of the spacer 62, the supporting member 64, and the sliding member 66, can be omitted from the bicycle hub assembly 10.

As seen in FIG. 4, the spacer 62 includes an annular portion 74. The spacer 62 includes at least one intermediate portion 72. In this embodiment, the spacer 62 includes a plurality of intermediate portions 72. The intermediate portion 72 extends from the annular portion 74 in the axial direction D1. The plurality of intermediate portions 72 is disposed to be spaced apart from each other in the circumferential direction D3 with respect to the rotational axis A1. In this embodiment, intermediate portion 72 has an elongated shape. The annular portion 74 can be omitted from the spacer 62.

The spacer 62 includes a non-metallic material. In this embodiment, the non-metallic material includes a resin material. Examples of the resin material include synthetic resin. The non-metallic material can include a material other than the resin material instead of or in addition to the resin material. While the intermediate portions 72 and the annular portion 74 are integrally provided with each other as a one-piece unitary member in this embodiment, at least one of the intermediate portions 72 can be a separate portion from the annular portion 74. At least one of the intermediate portions 72 can be made of a different material from a material of the annular portion 74.

Figure 8:
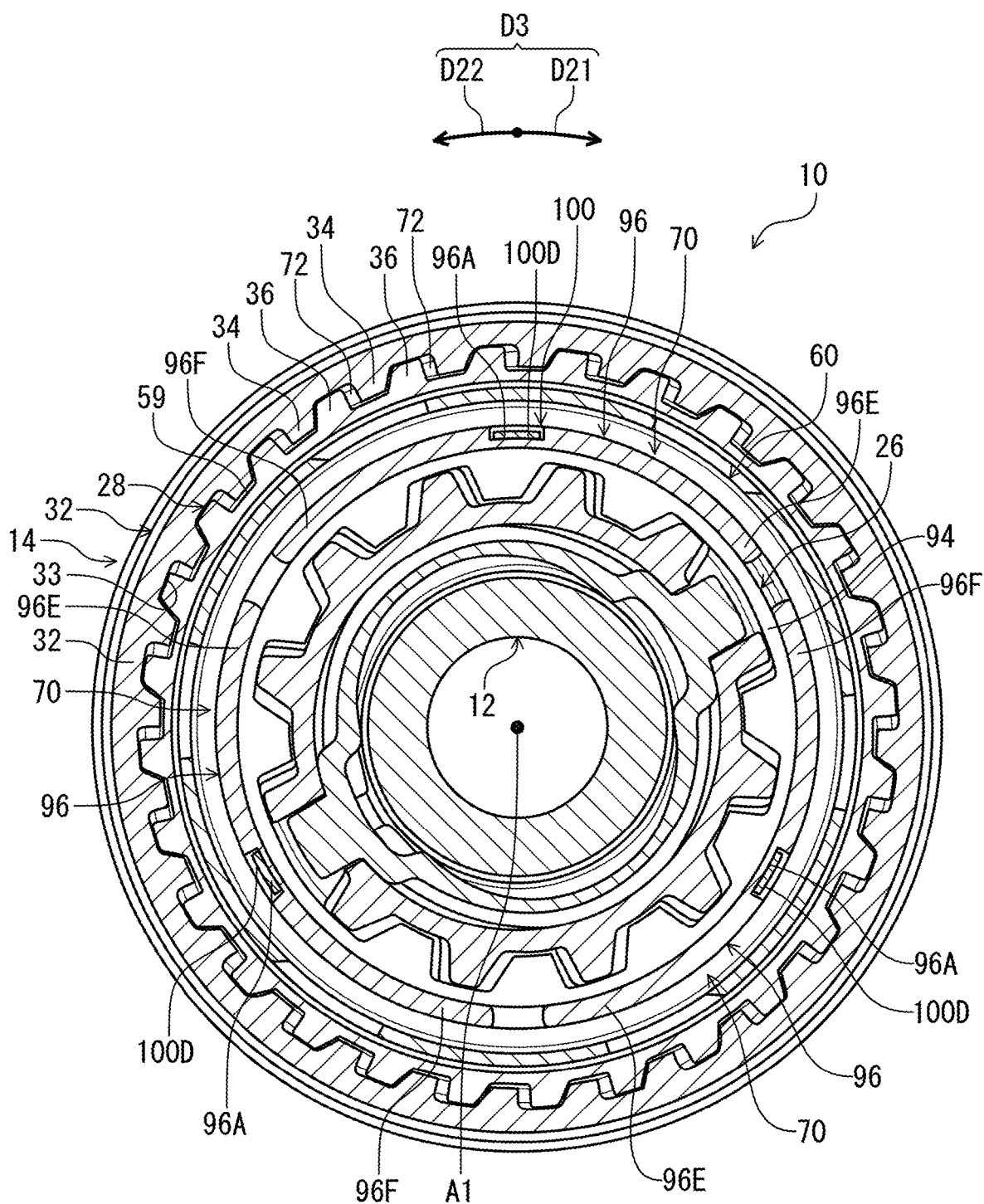
FIG. 8 is a cross-sectional view of the bicycle hub assembly taken along line VIII-VIII of FIG. 7.

As seen in FIG. 8, the intermediate portion 72 is provided between the first tooth 34 and the second tooth 36 in the circumferential direction D3. In this embodiment, a total number of the intermediate portions 72 is 28. A total number of the first teeth 34 is 28. A total number of the second teeth 36 is 28. However, the total number of the intermediate portions 72 is not limited to this embodiment. The total number of the first teeth 34 is not limited to this embodiment. The total number of the second teeth 36 is not limited to this embodiment. The plurality of intermediate portions 72 are provided radially between the inner peripheral surface 33 of the freewheel housing 32 of the hub shell 14 and the outer periphery 59 of the second ratchet member 28.

As seen in FIG. 7, the supporting member 64 is provided between the spacer 62 and the hub shell body 31 of the hub shell 14 in the axial direction D1. The supporting member 64 is provided between the second ratchet member 28 and the hub shell body 31 of the hub shell 14 in the axial direction D1. The hub shell 14 includes a hub axial surface 76 facing in the axial direction D1. The supporting member 64 is provided between the hub axial surface 76 and the second ratchet member 28 in the axial direction D1. The supporting member 64 is attached to the second ratchet member 28.

The supporting member 64 includes a non-metallic material. In this embodiment, the non-metallic material includes a resin material. The non-metallic material can include a material other than the resin material instead of or in addition to the resin material.

The sliding member 66 is provided between the sprocket support body 16 and the second ratchet member 28 in the axial direction D1. The sprocket support body 16 includes a first axial surface 86 facing in the axial direction D1. The second ratchet member 28 includes a second axial surface 88 facing in the axial direction D1. The sliding member 66 is provided between the first axial surface 86 and the second axial surface 88 in the axial direction D1.

In this embodiment, the sliding member 66 includes a non-metallic material. In this embodiment, the non-metallic material includes a resin material. The non-metallic material can include a material other than the resin material instead of or in addition to the resin material. The sliding member 66 can include a metal material.

The at least one receiving member 70 is provided between the first ratchet member 26 and the first biasing member 60 in a radial direction with respect to the rotational axis A1. The first ratchet member 26 includes the receiving surface 92. The receiving member 70 is provided between the receiving surface 92 and the first biasing member 60 in the axial direction D1.

The first ratchet member 26 includes the cylindrical part 94. The at least one receiving member 70 is provided radially outwardly of the cylindrical part 94. As seen in FIG. 8, the plurality of receiving members 70 is radially provided between the first ratchet member 26 and the first biasing member 60. The plurality of receiving members 70 is radially provided between the cylindrical part 94 and the first biasing member 60.

Figure 9:
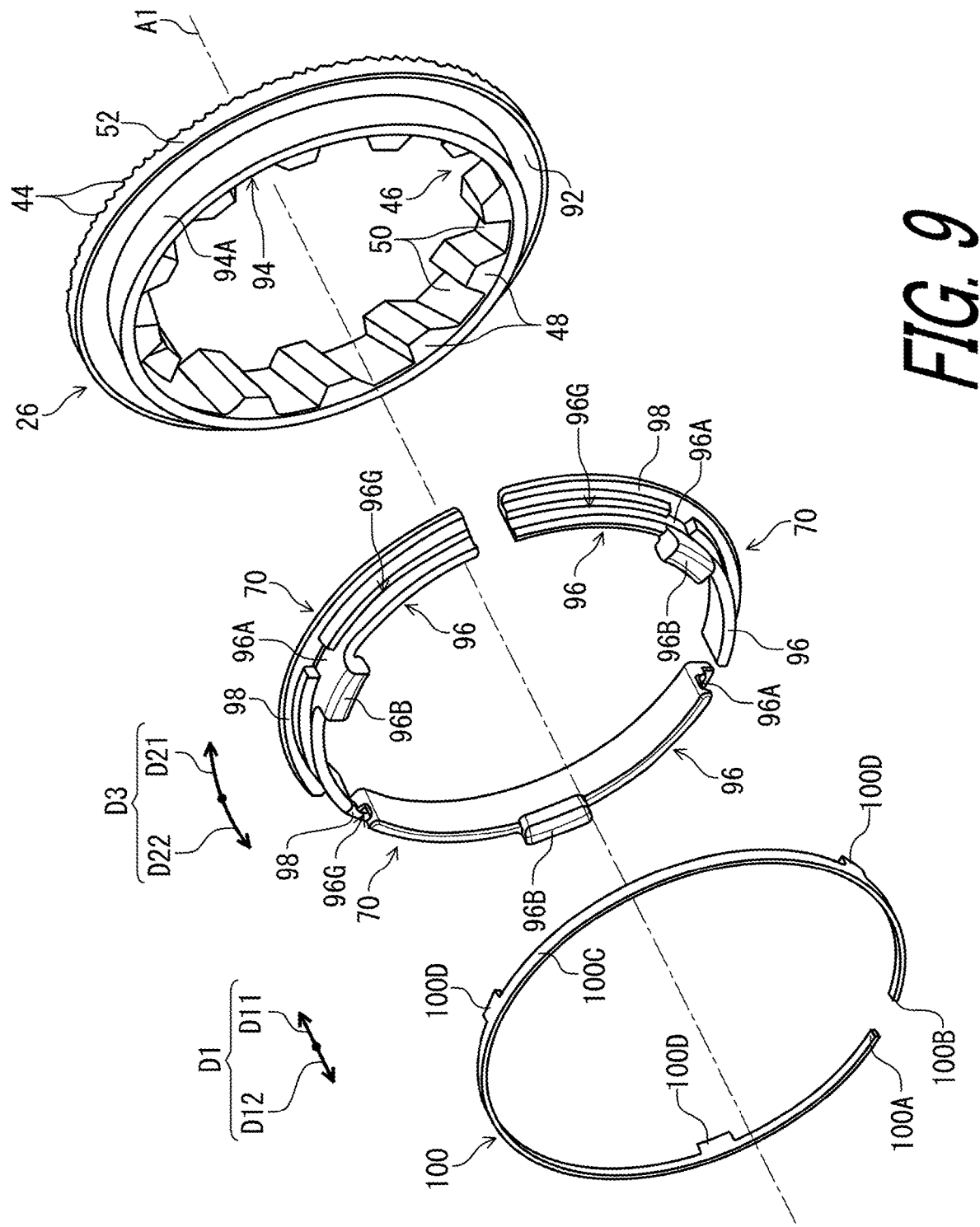
FIG. 9 is another exploded perspective view of the bicycle hub assembly illustrated in FIG. 1.

As seen in FIG. 9, the at least one receiving member 70 includes a radially receiving part 96 and an axially receiving part 98. The radially receiving part 96 has a radially outer surface 96A. The axially receiving part 98 is provided between the receiving surface 92 of the first ratchet member 26 and the first biasing member 60 in the axial direction D1. In this embodiment, each of the plurality of receiving members 70 includes the radially receiving part 96 having the radially outer surface 96A. Each of the plurality of receiving members 70 includes the axially receiving part 98.

The axially receiving part 98 extends radially outwardly from an axial end of the radially receiving part 96. In this embodiment, the axial end of the radially receiving part 96 is at the end of the first axial direction D11. The first biasing member 60 contacts the axially receiving part 98. The first biasing member 60 axially biases the axially receiving part 98.

As seen in FIG. 7, the radially receiving part 96 includes a curved portion 96C and a torque transmitting profile 96B. The radially receiving part 96 extends from the axially receiving part 98 in the axial direction D1. In this embodiment, the radially receiving part 96 extends from the axially receiving part 98 in the second axial direction D12. The radially receiving part 96 extends from a radially inner periphery of the axially receiving part 98 in the axial direction D1. In this embodiment, the radially receiving part 96 extends from the radially inner periphery of the axially receiving part 98 in the second axial direction D12. The radially receiving part 96 extends from a radially inner end portion of the axially receiving part 98 in the axial direction D1. In this embodiment, the radially receiving part 96 extends from the radially inner end portion of the axially receiving part 98 in the second axial direction D12.

Figure 10:
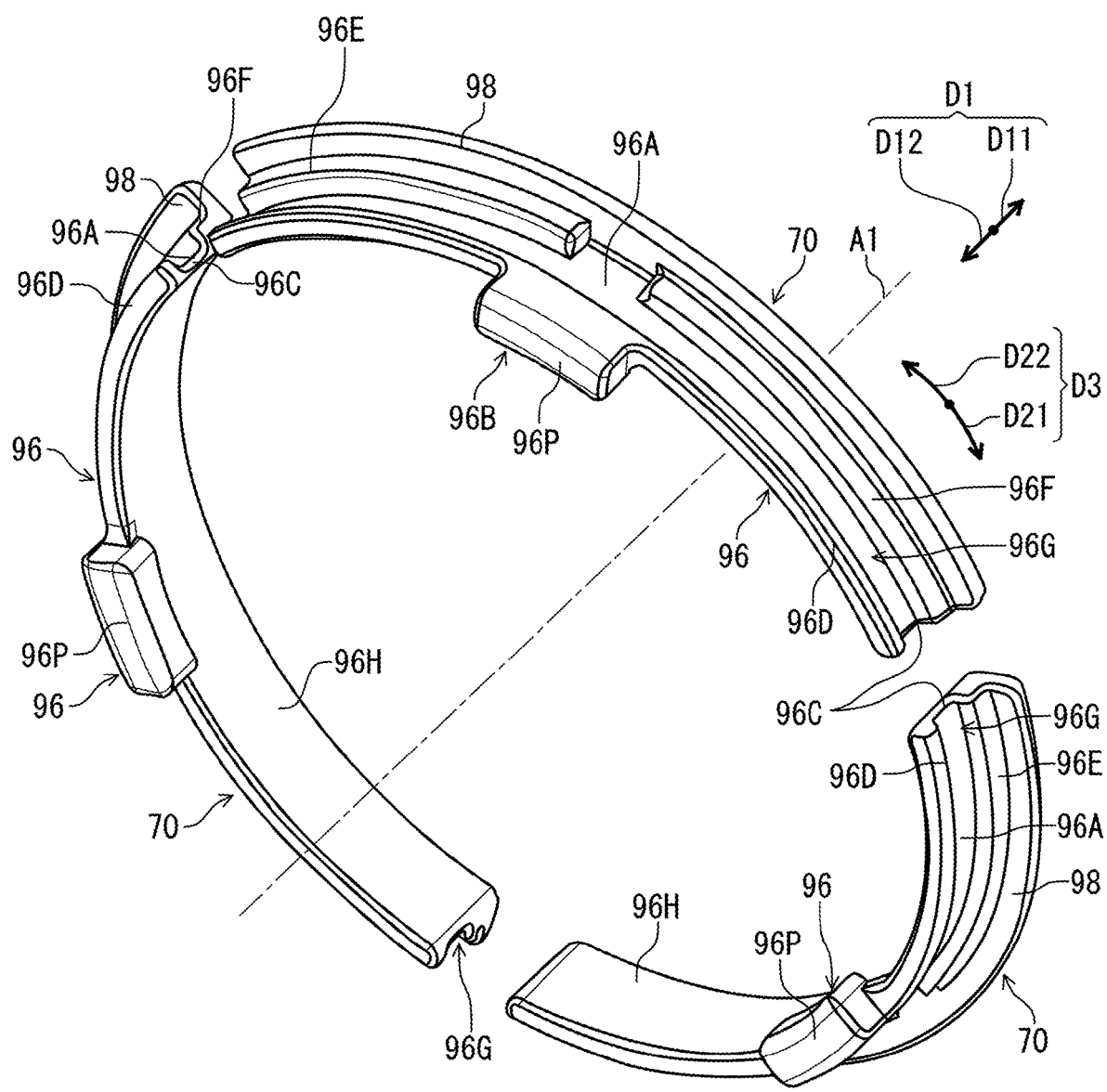
FIG. 10 is a perspective view of a plurality of receiving members of the bicycle hub assembly illustrated in FIG. 1.

As seen in FIG. 10, the radially receiving part 96 includes a curved portion 96C, a first wall 96D, a second wall 96E, and a third wall 96F.

The curved portion 96C is provided between the axially receiving part 98 and the torque transmitting profile 96B in a radial direction with respect to the rotational axis A1. The curved portion 96C extends from the axially receiving part 98 in the axial direction D1. The curved portion 96C extends in the axial direction D1 relative to the axially receiving part 98. The curved portion 96C extends from a radially inner periphery of the axially receiving part 98 in the axial direction D1. The curved portion 96C extends from a radially inner end portion of the axially receiving part 98 in the axial direction D1. The curved portion 96C extends in the circumferential direction D3. The curved portion 96C includes the radially outer surface 96A. The radially outer surface 96A is provided radially outwardly on the curved portion 96C. The curved portion 96C includes the radially inner surface 96H. The radially inner surface 96H is provided radially inwardly on the curved portion 96C. The curved portion 96C has an arc shape.

The curved portion 96C includes a first wall 96D, a second wall 96E, and a third wall 96F. The first wall 96D, the second wall 96E, and the third wall 96F are provided on the curved portion 96C. The first wall 96D, the second wall 96E, and the third wall 96F are provided on the radially outer surface 96A. The first wall 96D, the second wall 96E, and the third wall 96F extend radially outwardly from the curved portion 96C. The first wall 96D, the second wall 96E, and the third wall 96F extend radially outwardly from the radially outer surface 96A. The first wall 96D is configured to be spaced apart from the second wall 96E and the third wall 96F in axial direction D1. In this embodiment, the first wall 96D is configured to be spaced apart from the second wall 96E and the third wall 96F in second axial direction D12. The second wall 96E is configured to be spaced apart from the third wall 96F in the circumferential direction D3 with respect to the rotational axis A1. The curved portion 96C, the first wall 96D, the second wall 96E, and the third wall 96F define a circumferential groove 96G. The circumferential groove 96G is formed between the first wall 96D and the second wall 96E. The circumferential groove 96G is formed between the first wall 96D and the third wall 96F. The circumferential groove 96G extends in the circumferential direction D3.

The radially receiving part 96 has a torque transmitting profile 96B to transmit rotational torque between the at least one receiving member 70 and the hub shell 14. The torque transmitting profile 96B is provided at an axial end of the radially receiving part 96 opposite to the axially receiving part 98 in the axial direction D1. The torque transmitting profile 96B is provided at an axial end of the curved portion 96C opposite to the axially receiving part 98 in the axial direction D1. The torque transmitting profile 96B is configured to be engaged with the hub shell 14. The torque transmitting profile 96B is configured to be engaged with the hub shell 14 to transmit torque between the receiving member 70 and the hub shell 14. The hub shell 14 includes an additional torque transmitting profile 14B. The additional torque transmitting profile 14B is configured to be engaged with the torque transmitting profile 96B of the receiving member 70. The receiving member 70 is rotatable along with the hub shell 14 relative to the first ratchet member 26. The receiving member 70 is rotatable along with the hub shell 14 relative to the first ratchet member 26 and the sprocket support body 16 in a state where the torque transmitting profile 96B is engaged with the additional torque transmitting profile 14B.

The torque transmitting profile 96B includes a torque transmitting protrusion 96P protruding from the curved portion 96C and the first wall 96D in the axial direction D1. The torque transmitting profile 96B includes a torque transmitting protrusion 96P. The torque transmitting protrusion 96P protrudes from the curved portion 96C in the axial direction D1. The torque transmitting protrusion 96P protrudes from the first wall 96D in the axial direction D1. The torque transmitting protrusion 96P has a circumferential length shorter than a circumferential length of the curved portion 96C.

As seen in FIG. 11, the additional torque transmitting profile 14B of the hub shell 14 includes at least one additional torque transmitting protrusion 14C. In this embodiment, the additional torque transmitting profile 14B of the hub shell 14 includes a plurality of additional torque transmitting protrusions 14C. The additional torque transmitting protrusions 14C is provided on the surface facing in the axial direction D1 of the hub shell 14. In this embodiment, the additional torque transmitting protrusions 14C is provided on the surface facing in the first axial direction D11 of the hub shell 14. The hub shell 14 includes at least one recess 14D. In this embodiment, the hub shell 14 includes a plurality of recesses 14D. For example, the hub shell 14 includes six recesses 14D. The recess 14D is provided between adjacent two protrusions 14C in the circumferential direction D3. The recess 14D is provided between adjacent two protrusions 14C of the plurality of additional torque transmitting protrusions 14C. The torque transmitting protrusion 96P is provided between adjacent two protrusions 14C. The torque transmitting protrusion 96P is provided between adjacent two protrusions 14C of the plurality of additional torque transmitting protrusions 14C. The torque transmitting protrusion 96P is provided in the recess 14D. A convex shape of the torque transmitting protrusion 96P and a concave shape of the recess 14D can be reversed.

The receiving member 70 includes a non-metallic material. In this embodiment, the non-metallic material includes a resin material. The non-metallic material can include a material other than the resin material instead of or in addition to the resin material. The axially receiving part 98 and the radially receiving part 96 are integrally provided with each other as a one-piece unitary member. However, the axially receiving part 98 can be a separate member from the radially receiving part 96. The axially receiving part 98 can be made of a different material from a material of the radially receiving part 96.

As seen in FIG. 9, the bicycle hub assembly 10 comprises a second biasing member 100. In this embodiment, the second biasing member 100 has an annular shape. The second biasing member 100 has a first circumferential end 100A and a second circumferential end 100B configured to be spaced apart from the first circumferential end 100A in the circumferential direction D3 with respect to the rotational axis A1. The second biasing member 100 is elastically deformable in the radial direction. The second biasing member 100 is provided in the circumferential groove 96G of the receiving member 70. In this embodiment, the second biasing member 100 is provided in each circumferential groove 96G of the plurality of receiving members 70.

The second biasing member 100 includes a second biasing body 100C. The second biasing member 100 includes at least one protruding part 100D. In this embodiment, the second biasing member 100 includes a plurality of protruding parts 100D. The second biasing body 100C has an annular shape. The second biasing body 100C includes the first circumferential end 100A and the second circumferential end 100B. The second circumferential end 100B configured to be spaced apart from the first circumferential end 100A in the circumferential direction D3. The protruding part 100D protrudes from the second biasing body 100C in the axial direction D1. The protruding part 100D protrudes from the side facing in the axial direction D1 of the second biasing body 100C. The side is the long side of the second biasing body 100C. The plurality of protruding parts 100D protrudes from the second biasing body 100C in the axial direction D1. The plurality of protruding parts 100D is spaced apart from each other in the circumferential direction D3. As seen in FIG. 8, the protruding part 100D is provided between the second wall 96E and the third wall 96F of the radially receiving part 96. Thus, the protruding part 100D, the second wall 96E and the third wall 96F restrict a rotational movement between the receiving member 70 and the second biasing member 100 in the circumferential direction D3. Thus, the second biasing member defines the spacing between adjacent two receiving members 70.

As seen in FIG. 7, the second biasing member 100 contacts the radially outer surface 96A of the radially receiving part 96 to bias the radially receiving part 96 toward the rotational axis A1 in the radial direction. The second biasing member 100 contacts the radially outer surface 96A of the radially receiving part 96. The second biasing member 100 biases the radially receiving part 96 toward the rotational axis A1 in the radial direction. The second biasing member 100 radially inwardly biases the radially receiving part 96 of the receiving member 70 against the cylindrical part 94 of the first ratchet member 26. The radially receiving part 96 includes a radially inner surface 96H. The cylindrical part 94 includes a radially outer surface 94A. The radially inner surface 96H of the radially receiving part 96 slidably contacts the radially outer surface 94A of the cylindrical part 94. The second biasing member 100 increases a frictional force generated between the radially receiving part 96 of the receiving member 70 and the cylindrical part 94 of the first ratchet member 26. The frictional force increased by the second biasing member 100 is generated between the radially inner surface 96H and the radially outer surface 94A.

The receiving member moves with the first ratchet member 26 in the axial direction D1. Thus, the frictional force is not sensitive to the position of the first ratchet member in the axial direction D1. The size of the frictional force does not change with the position of the first ratchet member in the axial direction D1.

The action of the bicycle hub assembly 10 will be described in detail below referring to FIGS. 7 and 12 to 15.

As seen in FIG. 7, a biasing force µ1 is applied from the first biasing member 60 to the receiving member 70 in the first axial direction D11. The biasing force µ1 of the first biasing member 60 biases the receiving member 70, the first ratchet member 26, the second ratchet member 28, and the sliding member 66 toward the sprocket support body 16 in the first axial direction D11. This brings the plurality of first ratchet teeth 44 into engagement with the plurality of second ratchet teeth 56.

Figure 12:
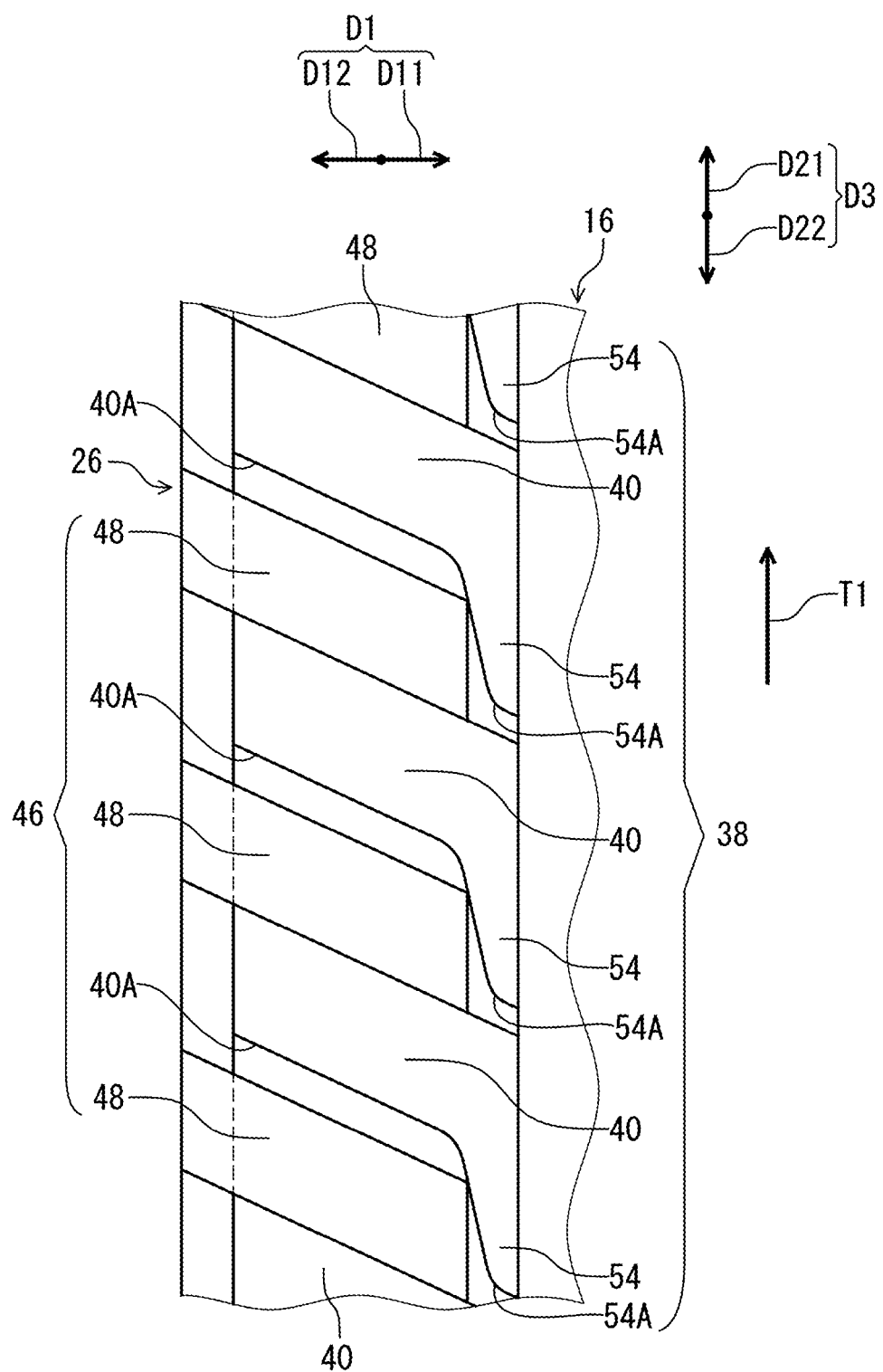
FIG. 12 is a schematic diagram showing an action of a first ratchet member and a sprocket support body of the bicycle hub assembly illustrated in FIG. 1 (pedaling).
Figure 13:
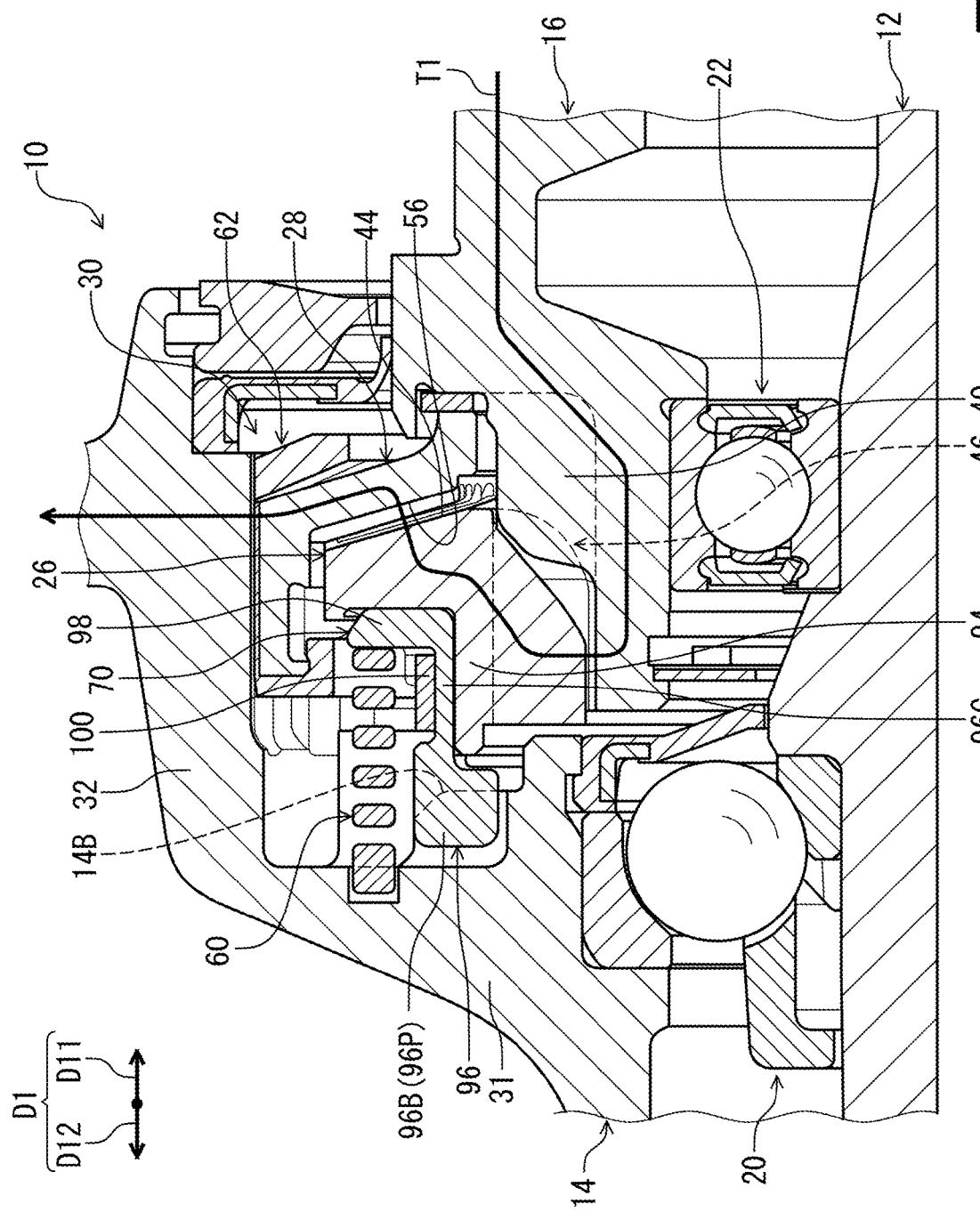
FIG. 13 is a partial cross-sectional view of the bicycle hub assembly illustrated in FIG. 1 (pedaling).

Furthermore, as seen in FIG. 12, when a pedaling torque T1 is input to the sprocket support body 16 in the driving rotational direction D21, the plurality of second spline teeth 48 is guided in the first axial direction D11 relative to the sprocket support body 16 by the plurality of first spline teeth 40. As seen in FIG. 13, this strongly brings the plurality of first ratchet teeth 44 into engagement with the plurality of second ratchet teeth 56. The first ratchet member 26 and the second ratchet member 28 are in an engaged state. The first ratchet member 26 is in an engaged position relative to the second ratchet member 28. In this state, the pedaling torque T1 is transmitted from the sprocket support body 16 to the hub shell 14 via the first ratchet member 26 and the second ratchet member 28. The receiving member 70 rotates along with the hub shell 14, the first ratchet member 26, and the second ratchet member 28 relative to the hub axle 12. Thus, sliding does not occur between the receiving member 70 and the first ratchet member 26.

Figure 15:
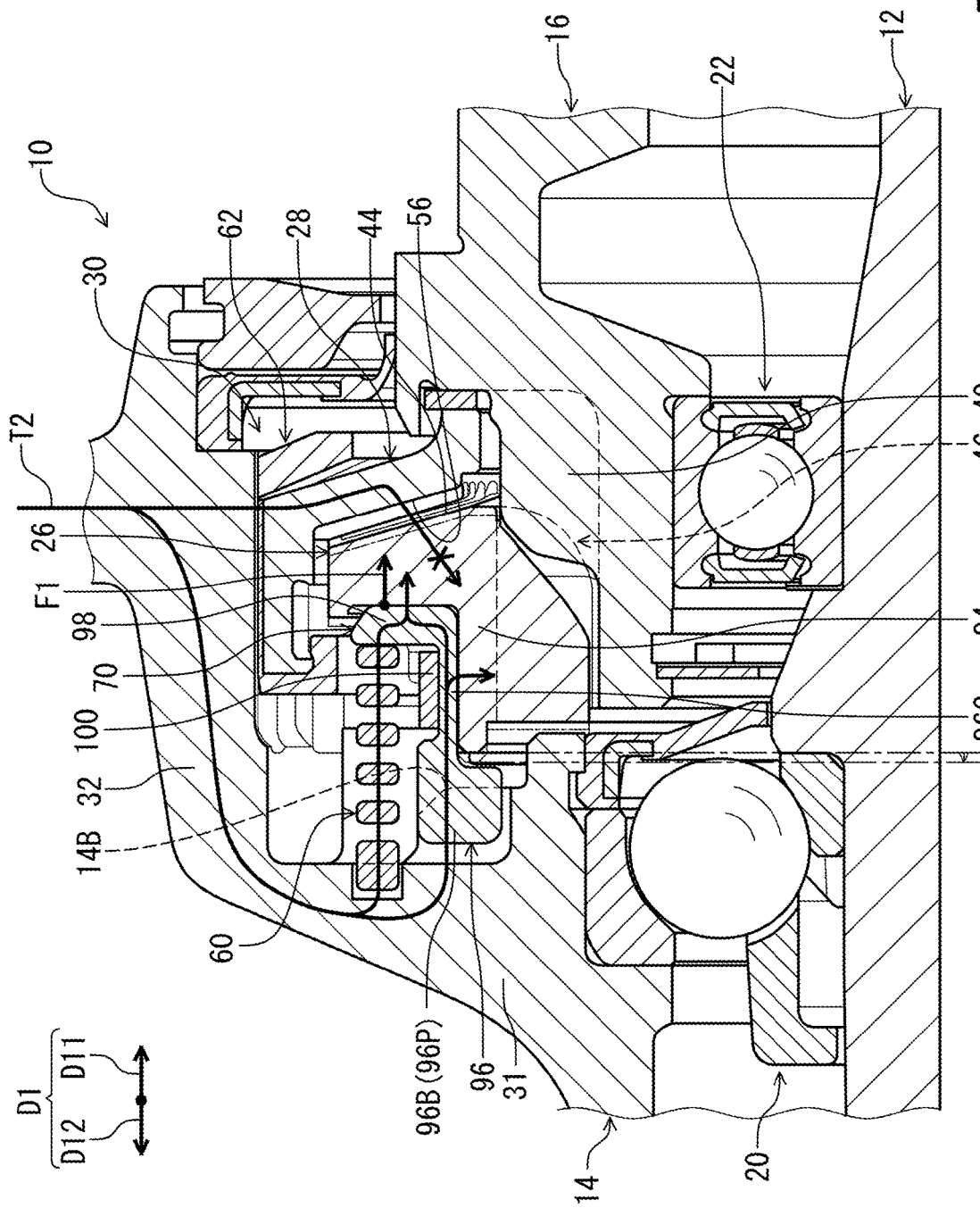
FIG. 15 is a partial cross-sectional view of the bicycle hub assembly illustrated in FIG. 1 (coasting).

As seen in FIG. 15, The coasting torque T2 is transmitted from the hub shell 14 to the first ratchet member 26 via the receiving member 70. The first ratchet member 26 disengages from the second ratchet member 28 during coasting. Thus, the coasting torque T2 is not transmitted from the second ratchet member 28 to the receiving surface 92 of the first ratchet member 26.

Figure 14:
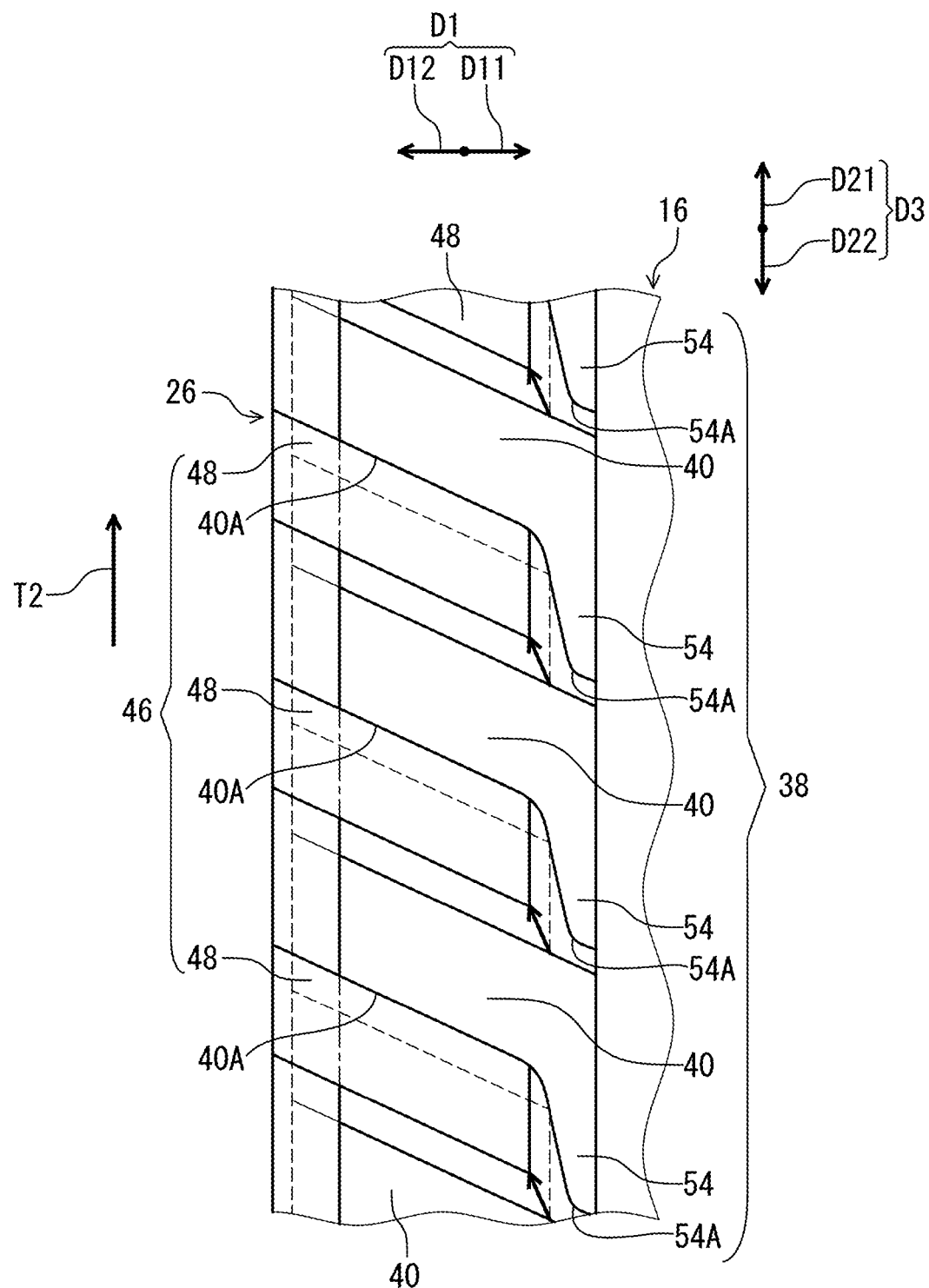
FIG. 14 is a schematic diagram showing an action of the first ratchet member and the sprocket support body of the bicycle hub assembly illustrated in FIG. 1 (coasting).

As seen in FIG. 14, a coasting torque T2 is applied to the hub shell 14 in the driving rotational direction D21 during coasting. As seen in FIG. 15, since the first biasing member 60 is configured to bias the axially receiving part 98 of the receiving member 70 toward the first ratchet member 26, the first biasing member 60 increases the frictional force generated between the axially receiving part 98 of the receiving member 70 and the first ratchet member 26. The axially receiving part 98 contacts the receiving surface 92.

Thus, the coasting torque T2 is transmitted from the hub shell 14 to the first ratchet member 26 via the first biasing member 60 and the receiving member 70. The coasting torque T2 is transmitted from the hub shell 14 to the first biasing member 60. The coasting torque T2 is transmitted from the first biasing member 60 to the receiving member 70. The coasting torque T2 is transmitted from the axially receiving part 98 of the receiving member 70 to the receiving surface 92 of the first ratchet member 26.

The torque transmitting profile 96B of the receiving member 70 is engaged with the additional torque transmitting profile 14B to transmit rotational torque between the receiving member 70 and the hub shell 14. Since the second biasing member 100 is configured to bias the plurality of radially receiving parts 96 of the plurality of receiving members 70 radially inwardly toward the cylindrical part 94 of the first ratchet member 26, the second biasing member 100 increases the frictional force generated between the first ratchet member 26 and the plurality of receiving members 70.

Thus, the coasting torque T2 is transmitted from the hub shell 14 to the first ratchet member 26 via the receiving member 70. The coasting torque T2 is transmitted from the hub shell 14 to the torque transmitting profile 96B. The coasting torque T2 is transmitted from the additional torque transmitting profile 14B to the torque transmitting profile 96B. The coasting torque T2 is transmitted from the torque transmitting profile 96B to the receiving member 70. The coasting torque T2 is transmitted from the radially receiving part 96 of the receiving member 70 to the radially outer surface 94A of the first ratchet member 26. The coasting torque T2 is transmitted from the radially receiving part 96 of the receiving member 70 to the cylindrical part 94 of the first ratchet member 26. The coasting torque T2 is transmitted from the axially receiving part 98 of the receiving member 70 to the receiving surface 92 of the first ratchet member 26.

In the first embodiment, the second biasing member 100 can be omitted from the bicycle hub assemblies 10. In such embodiment, the plurality of receiving members 70 can be integrally provided with each other as a one-piece unitary member. In this case, the coasting torque T2 is transmitted from the axially receiving part 98 to the receiving surface 92 of the first ratchet member 26. The coasting torque T2 is not transmitted from the radially receiving part 96 to the cylindrical part 94 of the first ratchet member 26.

As seen in FIG. 14, when the coasting torque T2 is transmitted from the hub shell 14 to the first ratchet member 26 in the driving rotational direction D21, the plurality of second spline teeth 48 is guided in the second axial direction D12 relative to the sprocket support body 16 by the first helical spline 38. The second spline tooth 48 of the first ratchet member 26 contacts the guiding portion 54. The second spline tooth 48 slides along the guiding surface 54A of the guiding portion 54 in the driving rotational direction D21 relative to the first spline tooth 40. The guiding surface 54A is an inclined surface inclined relative to a plane perpendicular to the rotational axis A1. The second helical spline 46 moves in the driving rotational direction D21 relative to the first helical spline 38 by the coasting torque T2. This moves the first ratchet member 26 in the second axial direction D12 relative to the sprocket support body 16. The first ratchet member 26 moves against the biasing force µl. Thus, the second helical spline 46 moves in the second axial direction D12 relative to the first helical spline 38. This causes that the first ratchet member 26 disengages from the second ratchet member 28. The first ratchet member 26 and the second ratchet member 28 are in a disengaged state. The first ratchet member 26 is in a disengaged position relative to the second ratchet member 28. As a result, the first ratchet teeth 34 of the first ratchet member 26 do not contact the second ratchet teeth 36 of the second ratchet member 28 during coasting. Thus, during casting, the first ratchet member 26 is moved away from the second ratchet member 28 in the second axial direction D12.

As seen in FIG. 15, this causes the engagement between the plurality of first ratchet teeth 44 and the plurality of second ratchet teeth 56 to be weaker. Thus, this causes the engagement between the plurality of first ratchet teeth 44 and the plurality of second ratchet teeth 56 to release. This allows the second ratchet member 28 to rotate relative to the first ratchet member 26 in the driving rotational direction D21.

After the first ratchet member 26 released from the second ratchet member 28, the first ratchet member 26 stops rotating relative to the sprocket support body 16. In the disengaged state, the first ratchet member 26 stops rotating relative to the sprocket support body 16. In that state, the receiving member 70 is rotating with the hub shell 14. Thus, a sliding contact occurs between the first ratchet member 26 and the receiving member 70. During coasting, the hub shell 14, the first biasing member 60 and the second ratchet member 28 rotate together relative to the first ratchet member 26. This restricts the coasting torque T2 from being transmitted from the hub shell 14 to the first ratchet member 26 via the second ratchet member 28. This restricts the coasting torque T2 from being transmitted from the hub shell 14 to the first ratchet member 26 via the receiving member 70. This restricts the coasting torque T2 from being transmitted from the hub shell 14 to the sprocket support body 16 via the first ratchet member 26, the second ratchet member 28 and the receiving member 70.

Second Embodiment

A bicycle hub assembly 210 in accordance with a second embodiment will be described below referring to FIG. 16. The bicycle hub assembly 210 has the same structure and/or configuration as those of the bicycle hub assembly 10 except for the receiving member 70. Thus, elements having substantially the same function as those in the first embodiment will be numbered the same here and will not be described and/or illustrated again in detail here for the sake of brevity.

Figure 16:
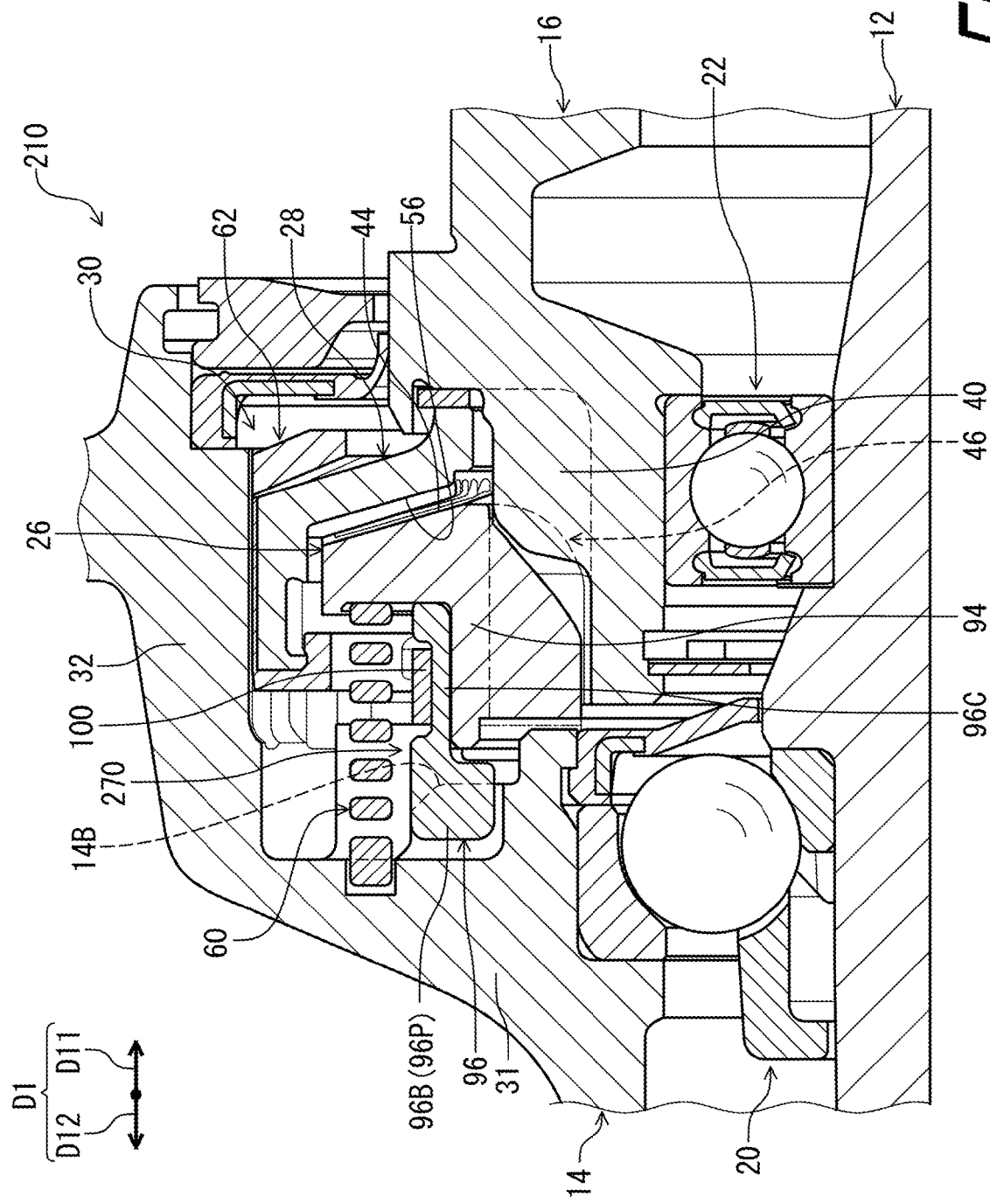
FIG. 16 is a partial cross-sectional view of a bicycle hub assembly in accordance with a second embodiment.

As seen in FIG. 16, the bicycle hub assembly 210 comprises at least one receiving member 270. The receiving member 270 has substantially the same structure as the structure of the receiving member 70 of the first embodiment. In this embodiment, the bicycle hub assembly 210 comprises a plurality of receiving members 270. The at least one receiving member 270 includes a plurality of receiving members 270. In this embodiment, the receiving member 270 does not include the axially receiving part 98. The first biasing member 60 contacts the first ratchet member 26. The first biasing member 60 contacts the receiving surface 92 of the first ratchet member 26.

The bicycle hub assembly 210 can comprise an additional sliding member between the first biasing member 60 and the first ratchet member 26. The additional sliding member is provided between the first biasing member 60 and the receiving surface 92. For example, the additional sliding member is a washer. The additional sliding member suppresses wear of the receiving surface 92 and the first biasing member 60.

The coasting torque T2 is transmitted from the first biasing member 60 to the receiving surface 92 of the first ratchet member 26 directly. The coasting torque T2 is transmitted from the torque transmitting profile 96B to the receiving member 270 of the first ratchet member 26. The coasting torque T2 is transmitted from the radially receiving part 96 of the receiving member 270 to the cylindrical part 94 of the first ratchet member 26. The coasting torque T2 is transmitted from the radially inner surface 96H to the radially outer surface 94A of the first ratchet member 26.

A sliding contact occurs, when the first ratchet member 26 stops rotating relative to the sprocket support body 16. The sliding contact occurs between the first biasing member 60 and the first ratchet member 26. The sliding contact occurs between the first biasing member 60 and the receiving surface 92. The sliding contact occurs between the receiving member 270 and the first ratchet member 26. The sliding contact occurs between the radially receiving part 96 and the cylindrical part 94. With the bicycle hub assembly 210, it is possible to obtain substantially the same effect as the effect of the bicycle hub assembly 10 of the first embodiment.

Third Embodiment

A bicycle hub assembly 310 in accordance with a third embodiment will be described below referring to FIG. 17. The bicycle hub assembly 310 has the same structure and/or configuration as those of the bicycle hub assembly 10 except for the receiving member 70. Thus, elements having substantially the same function as those in the first embodiment will be numbered the same here and will not be described and/or illustrated again in detail here for the sake of brevity.

Figure 17:
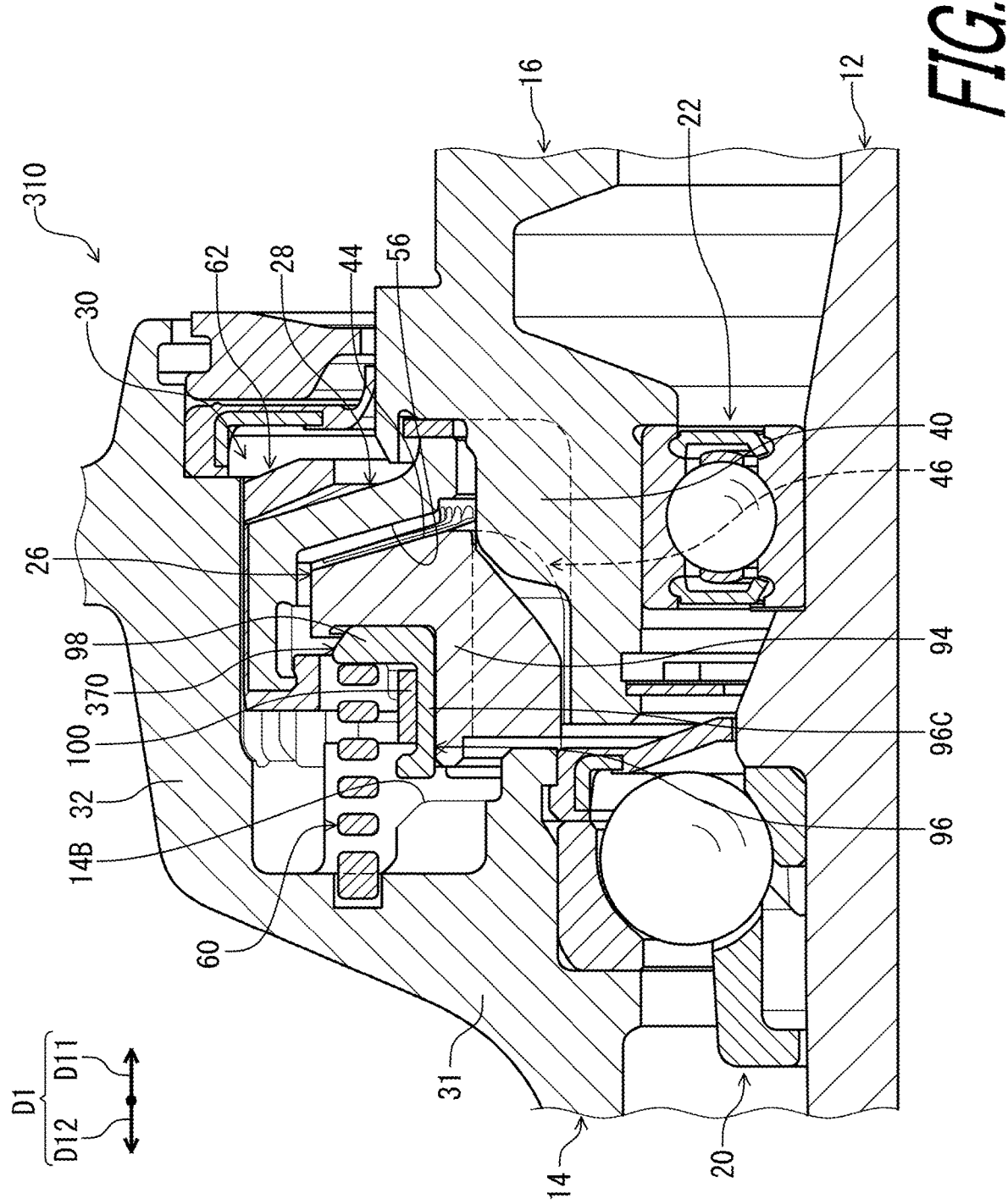
FIG. 17 is a partial cross-sectional view of a bicycle hub assembly in accordance with a third embodiment.

As seen in FIG. 17, the bicycle hub assembly 310 comprises at least one receiving member 370. The receiving member 370 has substantially the same structure as the structure of the receiving member 70 of the first embodiment. In this embodiment, the bicycle hub assembly 310 comprises a plurality of receiving members 370. The at least one receiving member 370 includes a plurality of receiving members 370. In this embodiment, the receiving member 370 does not include the torque transmitting profile 96B. The receiving member 370 does not engage with the hub shell 14.

The coasting torque T2 is transmitted from the first biasing member 60 to the first ratchet member 26 via the receiving member 370. The coasting torque T2 is transmitted from the first biasing member 60 to the axially receiving part 98 of the receiving member 370. The coasting torque T2 is transmitted from the axially receiving part 98 to the receiving surface 92 of the first ratchet member 26. The coasting torque T2 is transmitted from the radially receiving part 96 to the cylindrical part 94 of the first ratchet member 26. The coasting torque T2 is transmitted from the radially inner surface 96H to the radially outer surface 94A of the first ratchet member 26.

A sliding contact occurs, when the first ratchet member 26 stops rotating relative to the sprocket support body 16. The sliding contact occurs between the receiving member 370 and the first ratchet member 26. The sliding contact occurs between the axially receiving part 98 and the receiving surface 92. The sliding contact occurs between the radially receiving part 96 and the cylindrical part 94. With the bicycle hub assembly 310, it is possible to obtain substantially the same effect as the effect of the bicycle hub assembly 10 of the first embodiment.

In the third embodiment, the second biasing member 100 can be omitted from the bicycle hub assemblies 310. In such embodiment, the plurality of receiving members 370 can be integrally provided with each other as a one-piece unitary member. In this case, the coasting torque T2 is transmitted from the axially receiving part 98 to the receiving surface 92 of the first ratchet member 26. The coasting torque T2 is not transmitted from the radially receiving part 96 to the cylindrical part 94 of the first ratchet member 26.

Fourth Embodiment

A bicycle hub assembly 410 in accordance with a fourth embodiment will be described below referring to FIGS. 18 and 19. The bicycle hub assembly 410 has the same structure and/or configuration as those of the bicycle hub assembly 10 except for an additional receiving member 471. Thus, elements having substantially the same function as those in the first embodiment will be numbered the same here and will not be described and/or illustrated again in detail here for the sake of brevity.

Figure 18:
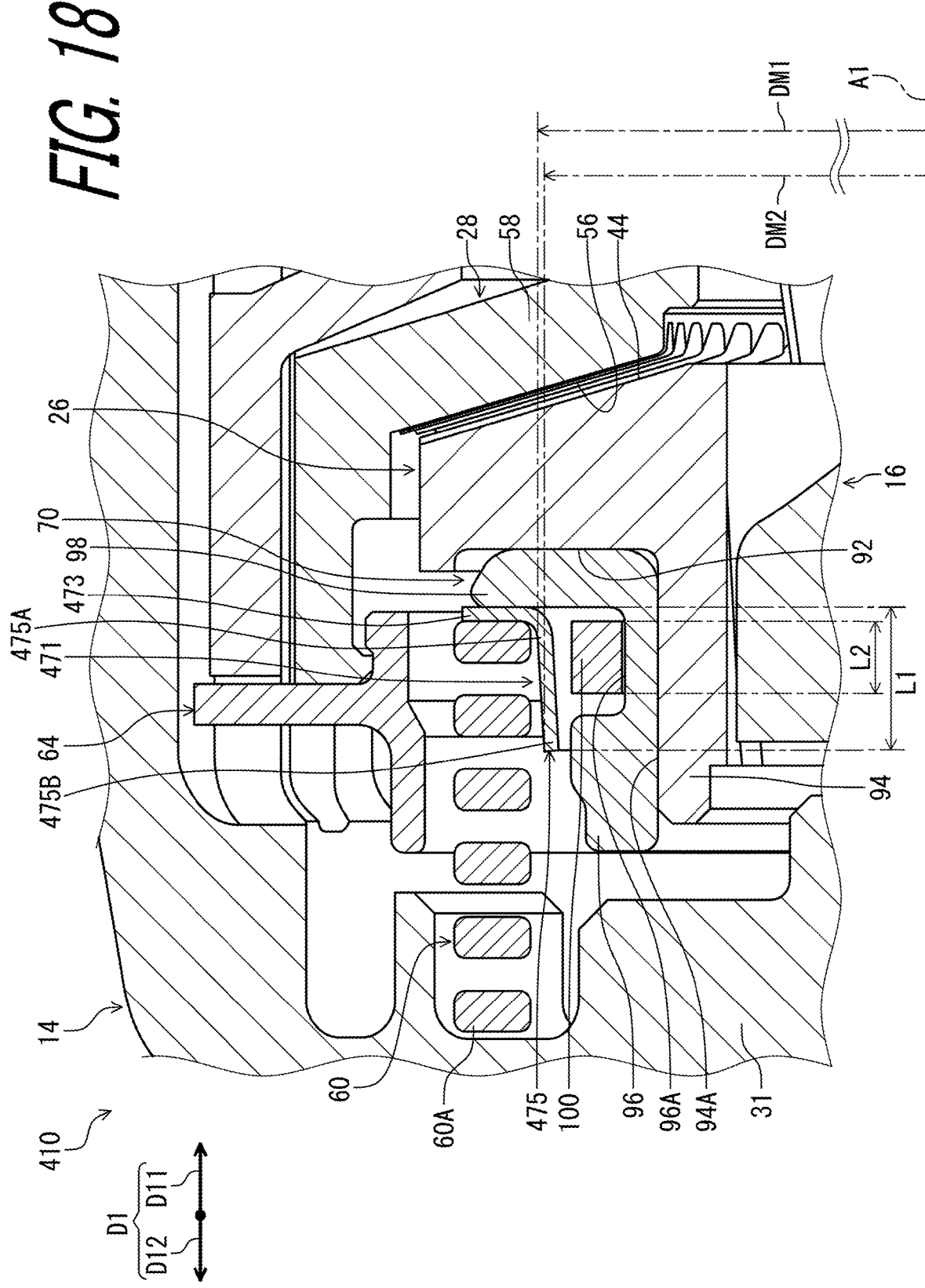
FIG. 18 is a partial cross-sectional view of a bicycle hub assembly in accordance with a fourth embodiment.

As seen in FIG. 18, the bicycle hub assembly 410 further comprises an additional receiving member 471. The additional receiving member 471 is provided between the first biasing member 60 and the second biasing member 100 in the radial direction with respect to the rotational axis A1. The additional receiving member 471 is provided between the first biasing member 60 and the at least one receiving member 70 in the axial direction D1 with respect to the rotational axis A1. The additional receiving member 471 is configured to reduce or restrict interference between the first biasing member 60 and the second biasing member 100.

In this embodiment, the additional receiving member 471 includes an additional axially receiving part 473 and an additional radially receiving part 475. The additional axially receiving part 473 is provided between the axially receiving part 98 of the at least one receiving member 70 and the first biasing member 60 in the axial direction D1. The additional radially receiving part 475 extends from the additional axially receiving part 473 in the axial direction D1 and is provided between the first biasing member 60 and the second biasing member 100 in the radial direction.

In this embodiment, the additional axially receiving part 473 extends radially outwardly from the additional radially receiving part 475. The additional axially receiving part 473 is provided radially outwardly of the additional radially receiving part 475. The additional axially receiving part 473 extends from the additional radially receiving part 475 in the radial direction. The additional axially receiving part 473 is configured to contact the first biasing member 60 in the axial direction D1. The first biasing member 60 is configured to bias the additional axially receiving part 473 toward the axially receiving part 98. The additional axially receiving part 473 is configured to contact the axially receiving part 98 in the axial direction D1. Thus, the additional axially receiving part 473 is held between the first biasing member 60 and the axially receiving part 98. The additional axially receiving part 473 is held between the first biasing member 60 and the axially receiving part 98 so that at least one of the position and posture of the additional receiving member 471 is maintained relative to the at least one receiving member 70.

The additional radially receiving part 475 is spaced apart from the at least one receiving member 70. The additional radially receiving part 475 is spaced apart from the radially receiving part 96 in the radial direction. The additional radially receiving part 475 is provided between the first biasing member 60 and the radially receiving part 96 in the radial direction. However, the additional radially receiving part 475 can at least partially contact the radially receiving part 96. For example, an axial end 475B of the additional radially receiving part 475 in the second axial direction D12 can at least partially contact the radially receiving part 96. In this embodiment, a diameter DM2 of the axial end 475B of the additional radially receiving part 475 in the second axial direction D12 is smaller than a diameter DM1 of an axial end 475A of the additional radially receiving part 475 in the first axial direction D11. This shape of the additional radially receiving part 475 can restrict the first biasing member 60 from catching on the axial end 475B of the additional radially receiving part 475.

The additional receiving member 471 has a first axial length L1 defined in the axial direction D1. The second biasing member 100 has a second axial length L2 defined in the axial direction D1. In this embodiment, the first axial length L1 is larger than the second axial length L2. However, the first axial length L1 can be equal to or smaller than the second axial length L2.

In this embodiment, the additional receiving member 471 is a separate member from the receiving member 70. However, the additional receiving member 471 can be integrally provided with the receiving member 70 as a one-piece unitary member. The additional receiving member 471 can be fastened to the receiving member 70. Furthermore, the additional axially receiving part 473 can be omitted from the additional receiving member 471. In such a modification, the additional radially receiving part 475 can be held to the receiving member 70.

The additional receiving member 471 is made of a material different from a material of the receiving member 70. The additional receiving member 471 is made of a metallic material such as stainless steel or iron. However, the additional receiving member 471 can be made of a non-metallic material such as a resin material. The additional receiving member 471 can be made of the same material as the material of the receiving member 70.

Figure 19:
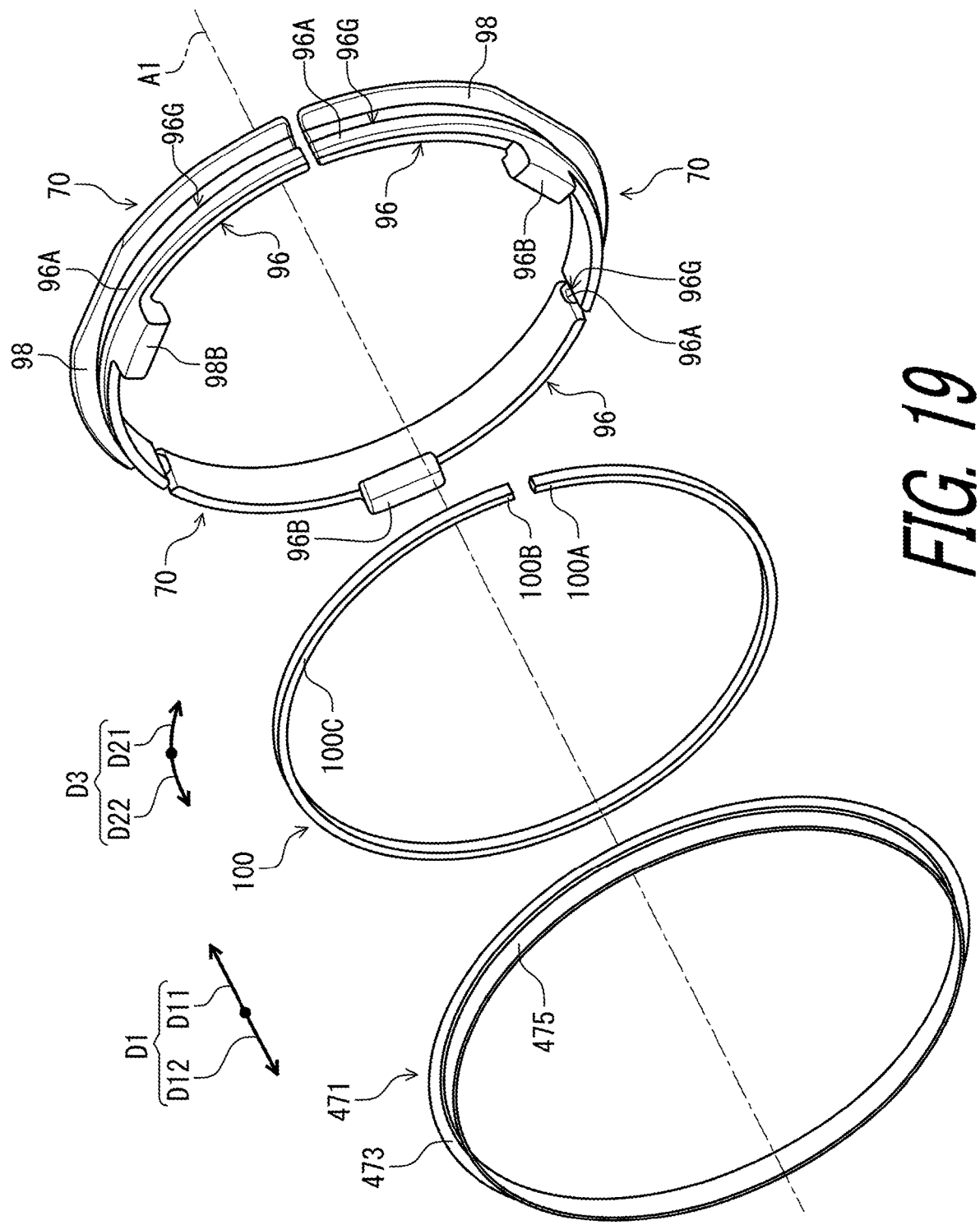
FIG. 19 is an exploded perspective view of the bicycle hub assembly illustrated in FIG. 18.

As seen in FIG. 19, the additional receiving member 471 has an annular shape. The additional axially receiving part 473 has an annular shape. The additional radially receiving part 475 has an annular shape. In this embodiment, the additional radially receiving part 475 has a tubular shape. The additional axially receiving part 473 has a flange shape extending radially outwardly from the additional radially receiving part 475. However, the additional receiving member 471 can have a shape other than an annular shape. The additional axially receiving part 473 can have a shape other than an annular shape. The additional radially receiving part 475 can have a shape other than an annular shape. The protruding parts 100D are omitted from the second biasing member 100.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed.

All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle hub assembly comprising:
   a hub axle defining a rotational axis;
   a hub shell rotatably mounted to the hub axle to rotate about the rotational axis, the hub shell including at least one first tooth;
   a sprocket support body rotatably mounted to the hub axle to rotate about the rotational axis, the sprocket support body including a first helical spline;
   a first ratchet member including:
      at least one first ratchet tooth;
      a second helical spline configured to engage with the first helical spline; and
      a receiving surface facing in an axial direction with respect to the rotational axis;
   a second ratchet member including:
      at least one second ratchet tooth configured to engage with the at least one first ratchet tooth; and
      at least one second tooth configured to engage with the at least one first tooth;
   a first biasing member provided between the hub shell and the first ratchet member in the axial direction to bias the first ratchet member toward the second ratchet member, the first ratchet member being provided between the second ratchet member and the first biasing member in the axial direction;
   at least one receiving member provided between the first ratchet member and the first biasing member in a radial direction with respect to the rotational axis, the at least one receiving member including a radially receiving part having a radially outer surface; and
   a second biasing member contacting the radially outer surface of the radially receiving part to bias the radially receiving part toward the rotational axis in the radial direction.

2. The bicycle hub assembly according to claim 1, wherein
   the radially receiving part has a torque transmitting profile to transmit rotational torque between the at least one receiving member and the hub shell.

3. The bicycle hub assembly according to claim 1, wherein
   the second biasing member has an annular shape.

4. The bicycle hub assembly according to claim 3, wherein
   the second biasing member has a first circumferential end and a second circumferential end configured to be spaced apart from the first circumferential end in a circumferential direction with respect to the rotational axis.

5. The bicycle hub assembly according to claim 1, wherein
   the first ratchet member includes a cylindrical part extending from the receiving surface in the axial direction, and
   the at least one receiving member is provided radially outwardly of the cylindrical part.

6. The bicycle hub assembly according to claim 1, wherein
   the at least one receiving member includes a plurality of receiving members.

7. The bicycle hub assembly according to claim 6, wherein
   the plurality of the receiving members is disposed to be spaced apart from each other in a circumferential direction with respect to the rotational axis.

8. The bicycle hub assembly according to claim 1, wherein
   the first ratchet member is configured to engage with one of the hub shell and the sprocket support body in a torque transmitting manner,
   the second ratchet member is configured to engage with the other of the hub shell and the sprocket support body in a torque transmitting manner, and
   at least one of the first ratchet member and the second ratchet member is movable relative to the hub axle in the axial direction.

9. The bicycle hub assembly according to claim 1, wherein
   the first ratchet member is configured to engage with the sprocket support body in a torque transmitting manner.

10. The bicycle hub assembly according to claim 1, wherein
    the sprocket support body has an outer peripheral surface to which the first helical spline is provided, and includes a guiding portion provided to the outer peripheral surface to guide the first ratchet member toward the hub shell during coasting.

11. The bicycle hub assembly according to claim 10, wherein
    the guiding portion guides the first ratchet member toward the hub shell to release meshing engagement between the at least one first ratchet tooth and the at least one second ratchet tooth during coasting.

12. The bicycle hub assembly according to claim 1, wherein
    the at least one receiving member includes an axially receiving part provided between the receiving surface of the first ratchet member and the first biasing member in the axial direction, and
    the radially receiving part extends from the axially receiving part in the axial direction.

13. The bicycle hub assembly according to claim 1, further comprising
    an additional receiving member provided between the first biasing member and the second biasing member in the radial direction with respect to the rotational axis.

14. The bicycle hub assembly according to claim 13, wherein
    the at least one receiving member includes an axially receiving part provided between the receiving surface of the first ratchet member and the first biasing member in the axial direction,
    the radially receiving part extends from the axially receiving part in the axial direction,
    the additional receiving member includes an additional axially receiving part and an additional radially receiving part,
    the additional axially receiving part is provided between the axially receiving part of the at least one receiving member and the first biasing member in the axial direction, and
    the additional radially receiving part extends from the additional axially receiving part in the axial direction and is provided between the first biasing member and the second biasing member in the radial direction.

15. The bicycle hub assembly according to claim 14, wherein the additional radially receiving part has an annular shape.

16. A bicycle hub assembly comprising:

a hub axle defining a rotational axis;

a hub shell rotatably mounted to the hub axle to rotate about the rotational axis, the hub shell including at least one first tooth;

a sprocket support body rotatably mounted to the hub axle to rotate about the rotational axis, the sprocket support body including a first helical spline;

a first ratchet member including:
  at least one first ratchet tooth;
  a second helical spline configured to engage with the first helical spline; and
  a receiving surface facing in an axial direction with respect to the rotational axis;

a second ratchet member including:
  at least one second ratchet tooth configured to engage with the at least one first ratchet tooth; and
  at least one second tooth configured to engage with the at least one first tooth;

a first biasing member provided between the hub shell and the first ratchet member in the axial direction to bias the first ratchet member toward the second ratchet member, the first ratchet member being provided between the second ratchet member and the first biasing member in the axial direction; and at least one receiving member having a torque transmitting profile that has a circumferentially-facing surface that engages with the hub shell to transmit rotational torque between the at least one receiving member and the hub shell.

17. The bicycle hub assembly according to claim 16, wherein the at least one receiving member includes
  an axially receiving part provided between the receiving surface of the first ratchet member and the first biasing member in the axial direction, and
  a radially receiving part extending from the axially receiving part in the axial direction, the radially receiving part including the torque transmitting profile.

18. The bicycle hub assembly according to claim 16, wherein the first ratchet member includes a cylindrical part extending from the receiving surface in the axial direction, and the at least one receiving member is provided radially outwardly of the cylindrical part.

19. The bicycle hub assembly according to claim 16, wherein the at least one receiving member includes a plurality of receiving members.

20. A bicycle hub assembly comprising:

a hub axle defining a rotational axis;

a hub shell rotatably mounted to the hub axle to rotate about the rotational axis, the hub shell including at least one first tooth;

a sprocket support body rotatably mounted to the hub axle to rotate about the rotational axis, the sprocket support body including a first helical spline;

a first ratchet member including:
  at least one first ratchet tooth;
  a second helical spline configured to engage with the first helical spline; and
  a receiving surface facing in an axial direction with respect to the rotational axis;

a second ratchet member including:
  at least one second ratchet tooth configured to engage with the at least one first ratchet tooth; and
  at least one second tooth configured to engage with the at least one first tooth;

a first biasing member provided between the hub shell and the first ratchet member in the axial direction to bias the first ratchet member toward the second ratchet member, the first ratchet member being provided between the second ratchet member and the first biasing member in the axial direction; and at least one receiving member having a torque transmitting profile to transmit rotational torque between the at least one receiving member and the hub shell, wherein the at least one receiving member includes a plurality of receiving members, and the plurality of the receiving members is disposed to be spaced apart from each other in a circumferential direction with respect to the rotational axis.

* * * * *